United States Patent
Gerber

(10) Patent No.: US 12,024,459 B2
(45) Date of Patent: Jul. 2, 2024

(54) METHOD AND DEVICE FOR HOT-SHAPING GLASS CONTAINERS

(71) Applicant: SCHOTT PHARMA SCHWEIZ AG, St. Gallen (CH)

(72) Inventor: Mauro Gerber, St. Gallen (CH)

(73) Assignee: SCHOTT PHARMA SCHWEIZ AG, St. Gallen (CH)

( * ) Notice: Subject to any disclaimer, the term of this patent is extended or adjusted under 35 U.S.C. 154(b) by 319 days.

(21) Appl. No.: 16/939,257

(22) Filed: Jul. 27, 2020

(65) Prior Publication Data
US 2020/0354255 A1 Nov. 12, 2020

Related U.S. Application Data

(63) Continuation of application No. PCT/EP2019/051694, filed on Jan. 24, 2019.

(30) Foreign Application Priority Data

Jan. 26, 2018 (DE) .................... 10 2018 101 832.0

(51) Int. Cl.
- *C03B 23/045* (2006.01)
- *C03B 23/09* (2006.01)
- *C03B 23/11* (2006.01)

(52) U.S. Cl.
CPC .......... *C03B 23/045* (2013.01); *C03B 23/095* (2013.01); *C03B 23/112* (2013.01)

(58) Field of Classification Search
None
See application file for complete search history.

(56) References Cited

U.S. PATENT DOCUMENTS

| 6,568,218 B1 * | 5/2003 | Mueller ................ C03B 23/092 |
| | | 65/276 |
| 2014/0041413 A1 | 2/2014 | Bartsch |
| 2014/0373574 A1 | 12/2014 | Moseler |
| 2015/0197443 A1 | 7/2015 | Voelkl |

(Continued)

FOREIGN PATENT DOCUMENTS

| CN | 103570227 | 2/2014 |
| CN | 104812714 | 7/2015 |

(Continued)

OTHER PUBLICATIONS

CN 108773996 machine translation, He, Qi-Xun, A High Precision Glass Bottle Opening Forming Device, Nov. 2018 (Year: 2018).*

(Continued)

*Primary Examiner* — Queenie S Dehghan
(74) *Attorney, Agent, or Firm* — Ruggiero McAllister & McMahon LLC

(57) ABSTRACT

A method for molding end portions on glass containers that store pharmaceutical active ingredients is provided. The glass containers are produced from a glass tube by hot-forming, an end portion having a neck opening using a centrally disposed opening forming tool interacting with a shaping tool at one end of the glass containers. In the method, dimensional data is provided for the respective glass tube and the position of the shaping tool is adjusted in a motorized manner in the axial direction (z) of the glass containers so as to correspond to the provided dimensional data for the respective glass tube.

16 Claims, 17 Drawing Sheets

(56) References Cited

U.S. PATENT DOCUMENTS

2016/0318789 A1   11/2016  Gromann
2017/0119967 A1    5/2017  Witte
2018/0273418 A1*  9/2018  Gaylo .................... G01N 25/00

FOREIGN PATENT DOCUMENTS

| CN | 106082607 | | 11/2016 | |
|---|---|---|---|---|
| CN | 106565076 | | 4/2017 | |
| CN | 108773996 A | * | 11/2018 | |
| DE | 541304 | | 1/1932 | |
| DE | 670112 | | 1/1939 | |
| DE | 2526569 | | 12/1976 | |
| DE | 10039098 A1 | * | 4/2001 | ........... C03B 23/095 |
| DE | 202004004560 | | 7/2004 | |
| DE | 10341300 | | 1/2005 | |
| EP | 2818454 | | 12/2014 | |
| GB | 1529385 | | 10/1978 | |
| WO | 2005092805 | | 10/2005 | |

OTHER PUBLICATIONS

DE 100 39 098, Bena et al., Producing Bottles Made of Glass Tubes, Apr. 2001 (Year: 2001).*
JP 2004051405 machine translation, Yamazaki et al., Apparatus for working glass tube end part, Feb. 2004 (Year: 2004).*
International Search Report dated May 3, 2019 for International Application No. PCT/EP2019/051694.

* cited by examiner

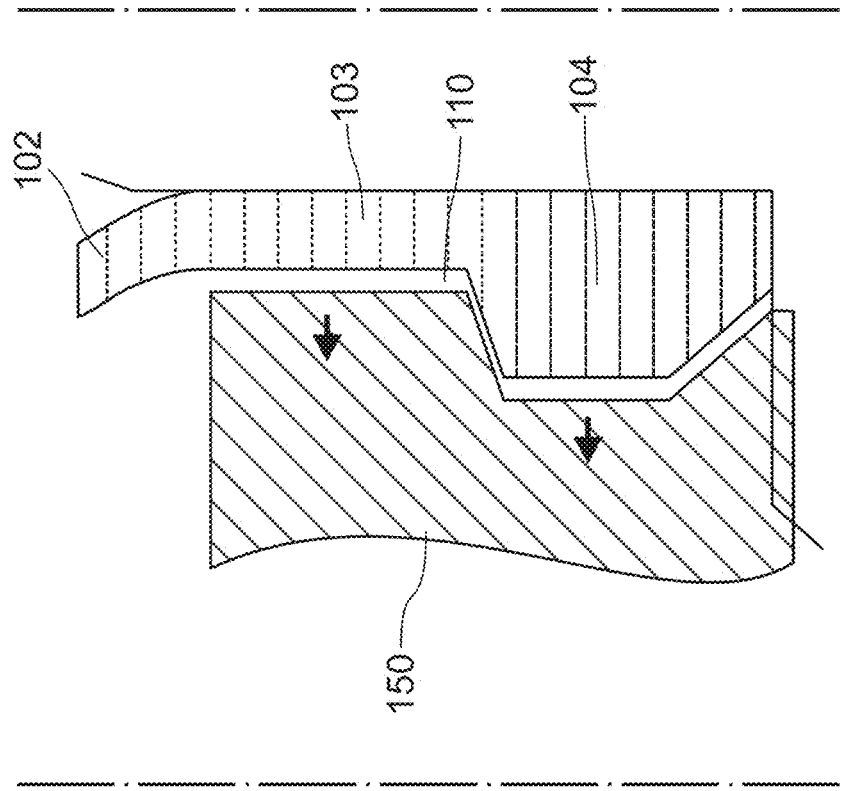
FIG. 2c
Prior Art
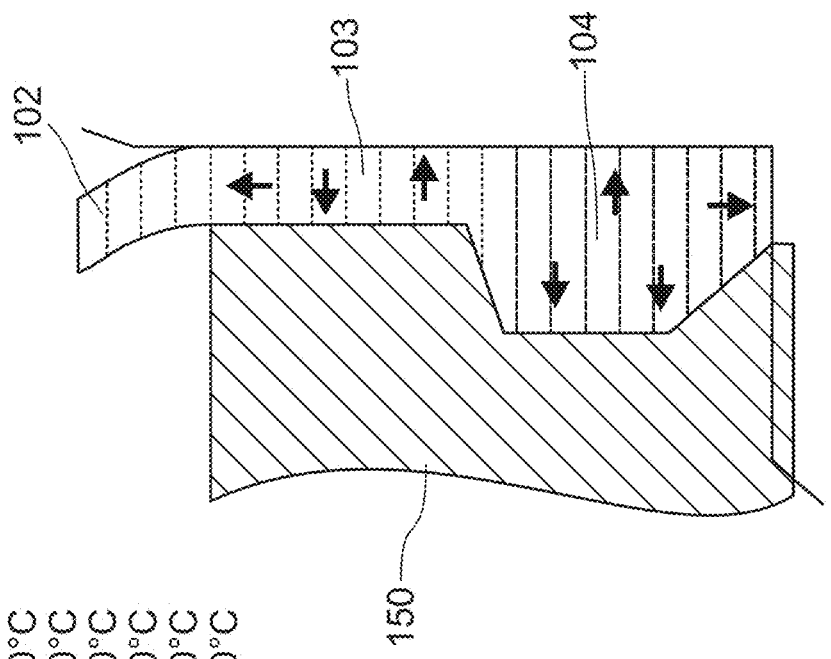
FIG. 2b
Prior Art
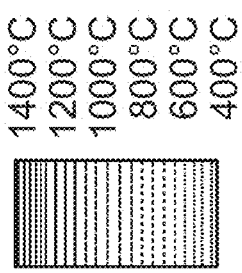

METHOD AND DEVICE FOR HOT-SHAPING GLASS CONTAINERS

CROSS REFERENCE TO RELATED APPLICATIONS

This application is a continuation of international application PCT/EP2019/051694 filed on Jan. 24, 2019, which claims the benefit of German Application 10 2018 101 832.0 filed on Jan. 26, 2018, the entire disclosures of both of which are explicitly incorporated by reference herewith.

BACKGROUND

1. Field of the Invention

The present invention relates generally to the production of glass containers, in particular for use as primary packaging means for pharmaceutical active ingredients, for example as small glass bottles (vials), cartridges, or syringe bodies, and relates in particular to a method and a device for hot-shaping such glass containers which are produced from a glass tube, wherein the method or the device, respectively, is conceived for predefining dimensions in the region of an opening in an end portion of such glass containers, for example in the region of an opening of small glass bottles (vials) or cartridges, or in the region of an ejection opening of a syringe body, by way of a consistently very high precision.

2. Description of Related Art

Such a hot-shaping device is known from DE 103 41 300 B3 and, as also the hot-shaping device according to the present invention, serves for producing glass containers from a glass tube, in particular for use as primary package means for pharmaceutical active ingredients, for example as small glass bottles (vials), cartridges, or syringe bodies.

Such a hot-shaping device is usually vertically aligned and is configured as a carousel machine. A carousel machine usually has two rotary tables which are in each case rotated step-by-step about an assigned rotary turret so as to pass through a series of processing stations up to processing and hot-shaping. A plurality of rotating holding chucks for holding workpieces, thus glass tube portions, are in each case disposed so as to be distributed over the circumference of the rotary tables. Tools and a plurality of gas burners for forming are assembled on the worktop of the hot-shaping device. In the operating mode, the rotary turrets pivot from one operating position to the next operating position and for transferring products are synchronized when transferring from the main turret to the auxiliary turret.

Comparable hot-shaping devices of the aforementioned type are disclosed in DE 20 2004 004 560 U1 and EP 2 818 454 A1.

A glass processing machine of the aforementioned type is disclosed in WO 2005/092805 A1 in which, for precisely configuring the neck opening of the glass containers, the shaping elements used in the hot-forming are adjusted in a direction perpendicular to the longitudinal axis of the glass containers, or the rotation axis of the rapidly rotating holding chuck, respectively, such that the axis of the shaping tool is precisely aligned with the axis of the rapidly rotating holding chuck. To this end, the respective shaping tool, for example a shaping mandrel, is assembled on a compound slide which can be adjusted in two directions (x, y) perpendicular to the axis of the rapidly rotating holding chuck. For this purpose, WO 2005/092805 A1 discloses an open-loop or closed-loop control of the compound slide.

FIG. 1 in a schematic sectional view shows the geometric conditions in the hot-shaping of the neck of a small glass bottle (vial). The vial 100 is chucked upside down in a rotating holding chuck (not shown) and is aligned so as to be exactly vertical (in the z-direction) such that no tumbling movements arise when rotating. Below the neck 103 a shaping mandrel 140 of a glass processing machine is assembled on a detent plate 141, said shaping mandrel 140 being vertically aligned. As is shown in FIG. 1, for hot-forming the shaping mandrel 140 which acts as an opening forming tool is introduced into the neck opening of the semi-finished intermediate product, wherein shaping rolls 150 acting as shaping tools act from the outside on the neck opening so as to establish the external contour of the neck opening, and wherein the detent plate 141 acting as a further shaping tool acts on the end of the semi-finished intermediate product so as to establish the shape of the mouth rim. A cavity is configured between the shaping rolls 150, the shaping mandrel 140, and the detent plate 141, the contour of said cavity being established by the external profile of the shaping rolls 150. During the hot-shaping, the external contour and the mouth rim of the glass container adapt to the contour of said cavity.

The aforementioned approach has been long known in this sector and has already been described in DE 670 112 A, for example.

However, when viewed more closely, important dimensions of the glass tubes used as the initial material do vary, this influencing the accuracy of the dimensions in the region of the neck opening of glass containers. This is because glass tubes are usually drawn from glass melts by the known Danner or Vello methods, such that the internal diameter and the external diameter and also the wall thickness in the longitudinal direction as well as in the circumferential direction of the glass tubes vary for production-related reasons.

FIG. 2*a* in an exemplary manner shows the variation in the external diameter of six glass tubes having a nominal value of 16.75 mm, such as said glass tubes are typically used for producing glass containers, in particular pharmaceutical packaging means. The external diameter does not only vary between the individual glass tubes but also in the longitudinal direction of said glass tubes. This in an analogous manner also applies in particular to the wall thickness of glass tubes. Such variations not only arise between different batches of glass tubes but also within the same batch.

In the conventional operating geometry according to FIG. 1, having rigidly disposed shaping tools, there is no possibility for excess glass resulting from such dimensional variations to be compensated for.

In order for such dimensional variations in the glass tubes used as the initial material to be compensated for, a usual approach lies in that the shaping rolls used for hot-forming by means of restoring springs are pretensioned toward the assigned shaping mandrel. This approach is schematically illustrated in FIGS. 2*b* and 2*c*.

FIG. 2*b* shows a state in which the volume of the heat-softened glass for a first glass tube in the region of the neck opening corresponds exactly to the volume of the aforementioned cavity which is configured between the shaping rolls 150, the detent plate, and the shaping mandrel. According to FIG. 2*c*, the corresponding volume of the heat-softened glass for a second glass tube in the region of the neck opening is smaller than said volume, for example because the wall thickness of the glass tube in the region be formed is smaller by virtue of variations in the wall thickness in the initial glass tube. In order for this effect to be compensated for, the shaping roll 150 is elastically pretensioned toward the shaping mandrel such that the gap 110 between the shaping rolls 150 and the external contour of the glass container in the region of the neck opening is at all times minute. On account thereof, not only dimensional variations of the initial glass tube in the region of the neck opening can be compensated for, but also excessive pressures in the forming region can be avoided, and cosmetic faults such as, for example, pressure marks, creases, scars, etc. can be avoided.

While the internal diameter of the neck opening can be predefined in a very precise manner by the shaping mandrel 140 by way of the conventional operating geometry according to FIG. 1, variations of this type in the mass of the heat-softened glass in the region of the hot-forming inevitably lead to dimensional variations at the neck opening in the finished glass container after the hot-forming. For example, important dimensions of the glass containers such as, for example, the wall thickness in the region of the rolled rim of vials, the wall thickness in the region of the neck 103 (cf. FIG. 1) or of the shoulder 102, the external diameter of the rolled rim 104, or else the height of the rolled rim 104 can in some instances vary to a significant extent. Likewise, excess glass can yield in an upward manner which can lead to a deformation of the shoulder of a small bottle.

Add to this a further effect which is caused by the operating mode of currently commonplace hot-shaping devices. Glass containers of the aforementioned type are usually produced round-the-clock on hot-shaping devices, wherein the process parameters when hot-shaping are usually set manually by a machine operator and are occasionally suitably adjusted during the ongoing operation. The subjective impression of the machine operator in terms of the operative behavior of the respective hot-shaping device herein plays a not insignificant part. Nowadays, all end products (glass containers after the hot-forming) are measured and evaluated by means of video inspection systems. The machine operator by means of said inspection results can readjust the process parameters when hot-shaping but in this instance only by way of the significant temporal delay.

Therefore, the machine operator when hot-shaping always sets the process parameters such that the dimensional variations of all finished end products (glass containers after the hot-forming) lie within acceptable tolerance limits. However, the setting of the process parameters herein cannot be performed for each glass tube.

This approach is illustrated in an exemplary manner in FIG. 3 in which the rolled-rim external diameter of glass vials is plotted over the ongoing production time. For a first batch of glass tubes (time up to 17:15) the rolled-rim external diameter for practically all glass vials lies in a band between approximately 19.78 mm and 19.96 mm. After a changeover to another batch of glass tubes having a presumably larger wall thickness, there is indeed more scattering in the rolled-rim external diameter. However, the rolled-rim external diameters always lie between a lower tolerance limit value and an upper tolerance limit value, said limit values being indicated by dashed lines.

FIG. 4 by way of example of the rolled-rim external diameter d2 (cf. FIG. 11*a*) shows a histogram for the distribution of the dimensional variations in the region of the neck opening. As can be derived from FIG. 4, the variance in the rolled-rim external diameter is approximately 0.02% of the nominal value when based on a normal distribution for the distribution of the rolled-rim external diameter. For a nominal value of the rolled-rim external diameter of 19.95 mm, the 95% confidence interval is of a magnitude of approximately 0.249 mm, for example. The same applies in analogous manner also to other important dimensions in the region of the neck opening in a direction perpendicular to the longitudinal direction of the glass containers.

DE 2526569 A1 discloses a method and a device for producing a tube from quartz glass having a tapered, cap-type end region. Herein, an initial glass tube having a non-round cross section is set in rotation and is heated in the end region until the end region becomes plastic. A cylindrical and tapered internal shaping tool is moved into the rotating end region. The external contour of the end region can additionally be defined by an opposite hollow-cylindrical external shaping tool. A motorized adjustment of the internal shaping tool and the external shaping tool is not disclosed. The adjustment of the internal shaping tool and the external shaping tool is not performed so as to correspond to the dimensional data for the respective glass tube.

There is thus further room for improvement with a view to the further increasing requirements set for the product quality of glass containers for use as primary packaging means for pharmaceutical active ingredients.

SUMMARY

It is a general object of the present invention to improve the conditions when producing glass containers from a glass tube by hot-forming with a view to glass containers being able to be reliably and efficiently produced at a consistently high quality and with consistently precise dimensions in the region of an end portion having an opening, for example in the region of a passage opening of a vial or of a cartridge or of a syringe cone of a syringe, even at very high cycle rates. It is in particular an object of the present invention to provide an improved method and an improved device for forming end portions having an opening on glass containers which are produced from a glass tube by hot-forming, in particular for molding necks having a neck opening in the case of vials or cartridges, or for forming a syringe cone having an ejection opening in the case of syringes, by way of which glass containers can be reliably and efficiently produced at a consistently high quality and with consistently precise dimensions in the region of the end portion having the opening, even at very high cycle rates.

According to the present invention, a method for forming end portions having an opening on glass containers is provided, which glass containers are produced from a glass tube by hot-forming, in particular on glass containers for storing pharmaceutical active ingredients, in which method an end portion having an opening, in particular a neck having a neck opening, is configured by hot-forming and by a centrally disposed opening forming tool interacting with at least one shaping tool assigned thereto at least at one end of the glass containers in that the opening forming tool is introduced into the opening and shaping tools for shaping an external contour of the end portion act from the outside on the opening, and/or in that a plate acting as a shaping tool for shaping a mouth rim of the opening acts on the respective end of the glass tube. Dimensional data, in particular relating to one or a plurality of the following variables is provided herein for each glass tube: wall thickness, external diameter and internal diameter of the glass tube used in the production. Said dimensional data is preferably provided so as to be resolved for a plurality of sub-portions in the longitudinal direction, or in the longitudinal direction and the circumferential direction, of the glass tube used in the production.

According to the invention, the position of at least one shaping tool interacting with the central opening forming tool is automatically adjusted, or adjusted in a motorized manner, respectively, in the axial direction of the glass containers (z-direction) so as to correspond to the provided dimensional data for the respective glass tube. The position of the shaping tool in the directions perpendicular to the axial direction of the glass containers (in the x-direction and y-direction) herein is preferably kept constant such that the dimensions of the finished glass containers perpendicular to the axial direction, thus in particular in the radial direction, are constant and correspond to the desired nominal values. According to the invention, variations in the glass volume in the region of the hot-forming of the glass tube to be processed are compensated for displacing the at least one shaping tool interacting with the opening forming tool in the axial direction. In other words, variations in the glass volume in the region to be formed, while keeping constant the dimensions of the finished glass container in a direction perpendicular to the axial direction, are compensated for in that the engagement position of the respective shaping tool are adjusted relative to the glass tube in the axial direction so as to correspond to the variations in the glass volume. The nominal dimensions perpendicular to the axial direction can thus be adhered to with maximum precision. The research by the inventors has demonstrated that a dimensional accuracy perpendicular to the axial direction is very important for many properties of the glass containers. For example, a dimensional accuracy perpendicular to the axial direction is thus very important for a firm sealing fit of sealing caps, plugs, or other closure elements in the region of a neck opening of vials or cartridges or of a Luer lock on a syringe cone of a syringe body, while a dimensional accuracy in the axial direction might be less important to this end.

According to one further embodiment, the adjustment of the position of the at least one shaping tool in the axial direction is carried out prior to the beginning of the hot-forming of the end portion, in particular of the neck or syringe cone, wherein the position of the at least one shaping tool in the axial direction is kept constant during the hot-forming of the end portion. The position of the respective shaping tool during the actual forming of the end portion having the opening is thus kept constant. Edges or rounded features on the glass container to be produced can thus be precisely formed without deviations arising by virtue of an adjustment during the hot-forming. According to this preferred embodiment, the adjustment of the shaping tools is thus performed in a cycled manner, so as to be synchronous with the conveying of the glass tubes to be formed from one processing station to the next processing station in the hot-forming device. The adjustment of the shaping tools herein is in each case performed more rapidly, preferably significantly more rapidly, in comparison to a temporal period which is required for conveying the glass tubes to be formed from one processing station to the next processing station in the hot-forming device.

Should the glass tube to be formed pass through a plurality of processing stations for hot-forming the end portion in succession, the positions of the shaping tools at all of said plurality of processing stations are preferably adjusted in a motorized manner by the same distance in the axial direction of the glass containers (z-direction) so as to correspond to the provided dimensional data for the respective glass tube, on account of which the dimensions of the glass containers in the axial direction in the region of the end portion can be kept constant despite the adjustment of the shaping tools in the axial direction. In the case of vials or cartridges, the position and the dimensions of a transition region between a cylindrical sidewall of the glass container having a constant external diameter and the end of the glass container on which the actual neck opening having constant external dimensions is configured, thus a rolled rim, for example, can also be kept constant in the axial direction.

According to one further embodiment, a plurality of shaping tools interact with the centrally disposed opening forming tool during the hot-forming, wherein all shaping tools are conjointly adjusted in the axial direction so as to correspond to the dimensional data for the respective glass tube, in order for variations in the glass volume in the region of the hot-forming of the glass tube to be processed to be compensated for. The centrally disposed opening forming tool herein is preferably adjusted with said shaping tools. However, an axial adjustment capability of the central opening forming tool can also be provided independently of the shaping tools interacting with the latter, for example in order for a shaping mandrel or pin acting as the opening forming tool to be moved further into the passage opening in a targeted manner in a specific phase of the hot-forming, for example toward the end of the hot-forming.

According to one further embodiment, the dimensional data includes at least a wall thickness of the respective glass tube in the region of the hot-forming. Variations in the wall thickness in the region to be formed correspond to variations in the glass volume in said region, said variations in glass volume being able to be compensated for by way of the adjustment according to the invention of shaping tools in the axial direction. Of course, the dimensional data can also include further geometric dimensions in the region of the initial glass tube to be formed, in particular the internal and/or the external diameter of the initial glass tube.

According to one further embodiment, the dimensional data is provided in that dimensional data for the respective glass tube, or for a glass container which has been produced in a previous hot-forming, is ascertained in a non-tactile manner, in particular by means of a video inspection system having an image evaluation software so as to precisely determine the dimensions of the initial glass tube in the region to be formed. The dimensional data herein is preferably resolved in terms of the location both in the axial direction as well as in the circumferential direction of the initial glass tube such that the glass volume in the region to be formed, and the variations in said glass volume, can be precisely calculated by means of the dimensional data.

According to one further embodiment, the dimensional data for the respective glass tube is alternatively provided by reading data from a database or a datasheet having tube-specific data pertaining to dimensions for the respective glass tube. The initial glass tubes in the further-processing operation prior to the hot-forming thus do not have to be freshly determined again in a complex manner because the tube-specific data has already been determined with high accuracy by the producer of the initial glass tube and is recorded in the database, an electronic storage medium, or on a datasheet.

According to one further embodiment, the dimensional data is further processed by an open-loop or closed-loop control installation which by means of the ascertained dimensional data emits an open-loop or closed-loop control variable to an actuator which is assigned to an adjustment installation, wherein the actuator adjusts the at least one shaping tool in the axial direction so as to correspond to the open-loop or closed-loop control variable.

According to one further embodiment, the open-loop or closed-loop control variable is determined by comparing the ascertained dimensional data with nominal values which are stored, for example, in a lookup table, a data memory, or the like. Said nominal values establish a suitable position of the respective shaping tool for the glass volume of the initial glass tube to be formed in each case in the z-direction such that any potential variations in the glass volume can be reliably compensated for. Said nominal values can be ascertained by practical testing of the hot-forming device, but can also be ascertained by calculations, simulations, or the like.

According to one further embodiment, the position of the at least one shaping tool in a direction perpendicular to the axial direction prior to the beginning of the hot-forming of the end portion having the opening is adjusted but is kept constant during the hot-forming of the end portion having the opening. The position of the respective shaping tool is thus kept constant also in the direction perpendicular to the axial direction during the actual neck-forming. Because the glass volume in the hot-forming region by virtue of the aforementioned adjustment in the axial direction in an optimum manner fills the gap between the centrically disposed opening forming tool and the externally disposed shaping rolls or the like, the desired dimensions of the finished glass container can be exactly adhered to without any deviations arising by virtue of an adjustment during the hot-forming. According to this preferred embodiment, the adjustment of the shaping tools is thus performed in a cycled manner, so as to be synchronous with the conveying of the glass tubes to be formed from one processing station to the next processing station in the hot-forming device.

According to one further embodiment which relates in particular to the production of glass vials, cartridges, or syringe bodies, for adjusting the at least one shaping tool the plate for shaping the mouth rim, a shaping roll for shaping the end portion, and/or a shaping roll for forming a shoulder or a taper in the region of the end portion of the glass container are/is adjusted in the axial direction.

According to one further embodiment, the hot-forming is carried out in a carousel machine which has a rotary table which is mounted so as to be rotatably movable and on which a plurality of holding chucks are disposed so as to be distributed in a circumferential direction, wherein one glass tube is in each case held in the holding chucks, and the glass tubes in a rotating movement of the rotary table in a step-by-step manner pass through a series of processing stations at which the hot-forming is performed with the aid of gas burners and/or of processing tools, wherein at least one of the processing stations has at least one shaping tool which is adjusted in the axial direction as has been described above, the dimensional data for each of the glass tubes held on the rotary table is provided, and the position of the at least one shaping tool for each of the glass tubes held on the rotary table for the hot-forming is individually adjusted in a motorized manner in the axial direction so as to correspond to the dimensional data for the respective glass tube.

According to one further embodiment, the adjustment of the position of the at least one shaping tool in the axial direction (z) is carried out prior to the beginning of the hot-forming of the end portion having the opening, and the position of the at least one shaping tool in the axial direction (z) is kept constant during the hot-forming of the end portion having the opening, wherein a temporal period for adjusting the position of the at least one shaping tool in the axial direction (z) prior to the beginning of the hot-forming of the end portion is shorter than a temporal period which is required for adjusting the glass tube by a rotating movement of the rotary table from a first processing station to a second processing station that when viewed in the rotating direction is disposed downstream.

According to one further embodiment, the adjustment of the position of the at least one shaping tool in the axial direction is carried out so as to correspond to the dimensional data for the respective glass tube in that a variance in the dimensions of the glass container after the hot-forming in the region of the end portion having the opening, in particular of wall thicknesses of the glass container in the region of a shoulder, of a neck, and/or of a rolled rim or syringe cone transversely to the longitudinal direction of the glass container, at least in the direction perpendicular to the axial direction (z) of the glass container, is correlated differently from the variance of the dimensional data of the glass tube used in the production. This is because, by virtue of the adjustment of the at least one shaping tool in the axial direction, the dimensions of the finished glass container in a direction perpendicular thereto can be practically predefined precisely but are no longer dependent on variations in the glass volume in the region to be formed, said variations in the glass volume being caused by dimensional variations of the initial glass tube.

According to one further aspect of the present invention, a hot-shaping device for forming end portions having an opening, in particular of necks on vials or cartridges, or a syringe cone on a glass syringe, is provided in particular on glass containers for storing pharmaceutical active ingredients, wherein the glass containers at least at one end have an end portion having an opening, for example a neck having a neck opening or a syringe cone, having a processing station at which the hot-forming is performed with the aid of gas burners and/or of processing tools, wherein the processing station has a centrally disposed opening forming tool and at least one shaping tool for shaping an external contour of the end portion and/or for shaping an mouth rim of the opening such that an end portion having a passage opening, in particular a neck having a neck opening or a syringe cone, is capable of being configured on the at least one end of the glass containers in that the centrally disposed opening forming tool is introduced into the opening and shaping tools for shaping an external contour of the end portion having the opening act from the outside on the opening and/or in that the plate, acting as a shaping tool, for shaping a mouth rim of the opening acts on the respective end of the glass tube. An adjustment installation which is conceived for adjusting the position of the at least one shaping tool in the axial direction of the glass container relative to the respective glass tube is provided for the at least one shaping tool herein.

According to the invention, the adjustment installation is assigned an actuator, wherein an open-loop or closed-loop control installation having an interface for entering dimensional data which have been ascertained for the respective glass tube to be processed provided, wherein the open-loop or closed-loop control installation, based on the entered dimensional data, is conceived for emitting an open-loop or closed-loop control variable to the actuator such that the actuator adjusts the at least one shaping tool in the axial direction so as to correspond to the open-loop or closed-loop control variable. Electrically activated adjustment installations, in particular stepper motors or piezo-electric actuators, can be used for the adjustment.

According to one further embodiment, the actuator adjusts the at least one shaping element in the axial direction so as to correspond to the open-loop or closed-loop control variable.

According to one further embodiment, the interface is connected to the non-tactile detection installation.

According to one further embodiment, the interface is furthermore conceived for reading the dimensional data for the respective glass tube from a database or a datasheet having tube-specific data for the respective glass tube.

According to one further embodiment, the at least one adjustment installation is furthermore conceived for adjusting an angular position of the assigned shaping tool in relation to a rotation axis about which the respective glass tube rotates during the hot-forming, wherein furthermore an adjustment installation for adjusting all shaping tools of the respective processing station in a direction perpendicular to the axial direction is provided, wherein said adjustment installation is conceived such that a center of the respective processing station is exactly aligned with the rotation axis.

A further aspect of the present invention relates to the use of the aforementioned method or of the aforementioned hot-shaping device for producing glass containers, in particular glass containers for storing pharmaceutical active ingredients.

A further aspect of the present invention relates to a plurality of glass containers, in particular for storing pharmaceutical active ingredients, composed of at least 40 glass containers which are produced from glass tubing by hot-forming and which are randomly, without prior measuring, extracted in an arbitrary sequence from an ongoing production run, wherein an end portion having an opening, or passage opening, respectively, in particular a neck having a neck opening, or a syringe cone having an injection opening, is configured on at least one end of a respective glass container.

According to the invention, a variance in at least one dimension in the region of the neck opening in a direction perpendicular to a longitudinal direction of the glass containers is better than 0.01% of the respective dimension, preferably better than 0.0075% of the respective dimension, and even more preferably better than 0.005% of the respective dimension

BRIEF DESCRIPTION OF THE FIGURES

The invention will be described hereunder in an exemplary manner and with reference to the appended drawings from which further features, advantages, and objects to be achieved will be derived. In the drawings:

FIGS. 2b and 2c in a schematic sectional view show an approach for compensating dimensional variations when producing small glass bottles by hot-shaping as per the prior art;

In the figures, identical reference signs refer to identical or to elements or groups of elements that have substantially identical functions.

DETAILED DESCRIPTION

Figure 5A:
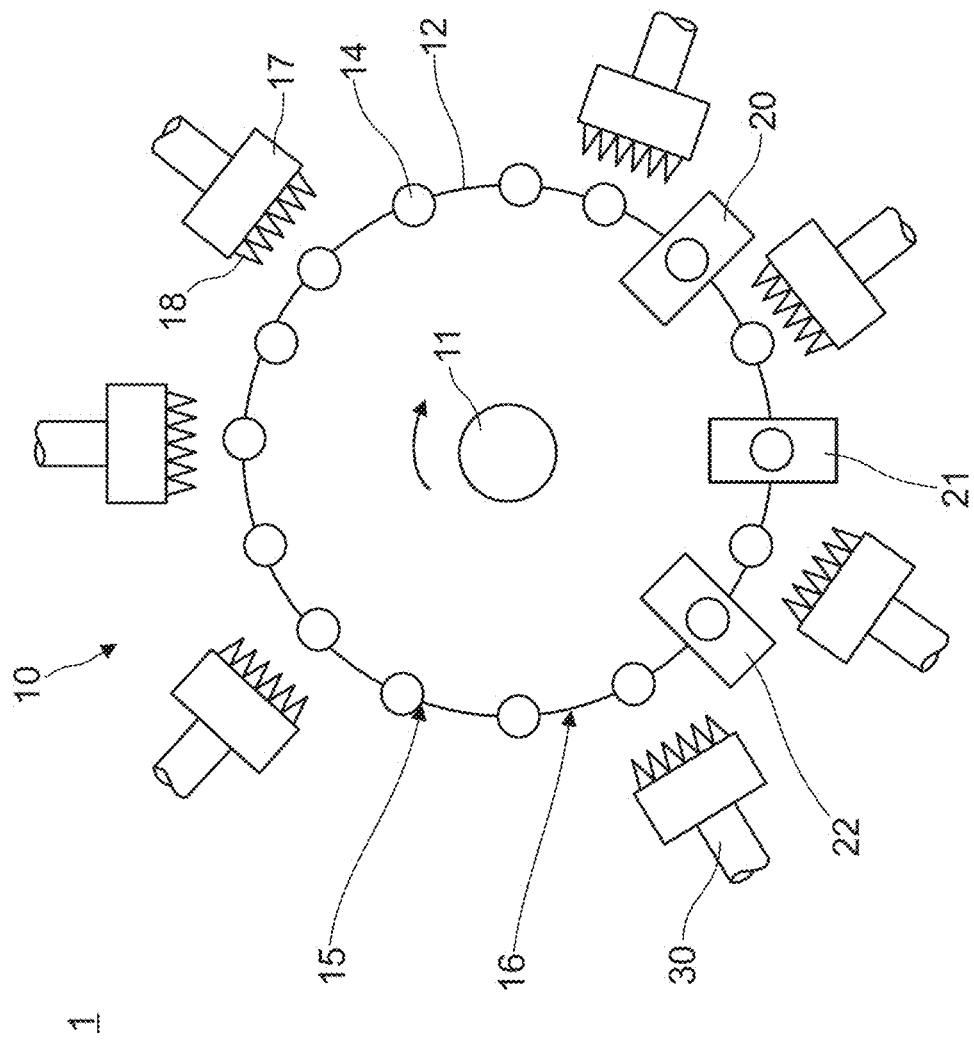
FIG. 5a in a schematic plan view shows parts of a hot-shaping device according to the present invention.

FIG. 5a in a schematic plan view shows the in-principle construction of a hot-shaping device 1 according to the present invention, which serves for producing glass containers from a glass tube 14 which is supplied so as to be vertically aligned from above. The glass containers to be produced, for example small glass bottles (vials), cartridges, or syringe bodies, serve for storing pharmaceutical active ingredients. The hot-shaping device 1 herein comprises a so-called host machine 10 which serves in particular for hot-forming the supplied glass tube 60 at an end that is opposite the later base or an open end of the glass container, in particular for molding thereon a neck having a neck opening or a syringe cone having an ejection opening.

Glass tubes 14 at the supply position 15 are supplied in the known manner and held in holding chucks at a suitable processing height, said holding chucks being disposed so as to be distributed over the circumference of a rotary table 12. The rotary table 12 is configured in the manner of a ring mount having holding chucks and is mounted so as to be rotatably movable on the assigned column 11. The rotary table 12 is rotated or pivoted, respectively, step-by-step about the assigned column 11. The glass tubes 14 held on the holding chucks herein are guided step-by-step past gas burners 17 and different processing stations 20-22 at which the processing and hot-forming so as to form glass containers is performed during a respective stoppage time. After passing the processing stations 20-22, the glass containers at least in the region of the neck and the neck opening are tested in a non-tactile manner with the aid of an inspection system 30 and the properties of said glass containers are documented. The inspection system 30 can be, for example, a video camera having an image evaluation software, wherein geometric dimensions of the glass containers are evaluated by means of the images recorded by the video camera, for example the geometric dimensions in the case of glass vials, said geometric dimensions being summarized in FIGS. 11a and 11b. The glass containers at the position 16 are finally transferred to a downstream processing machine.

Figure 5B:
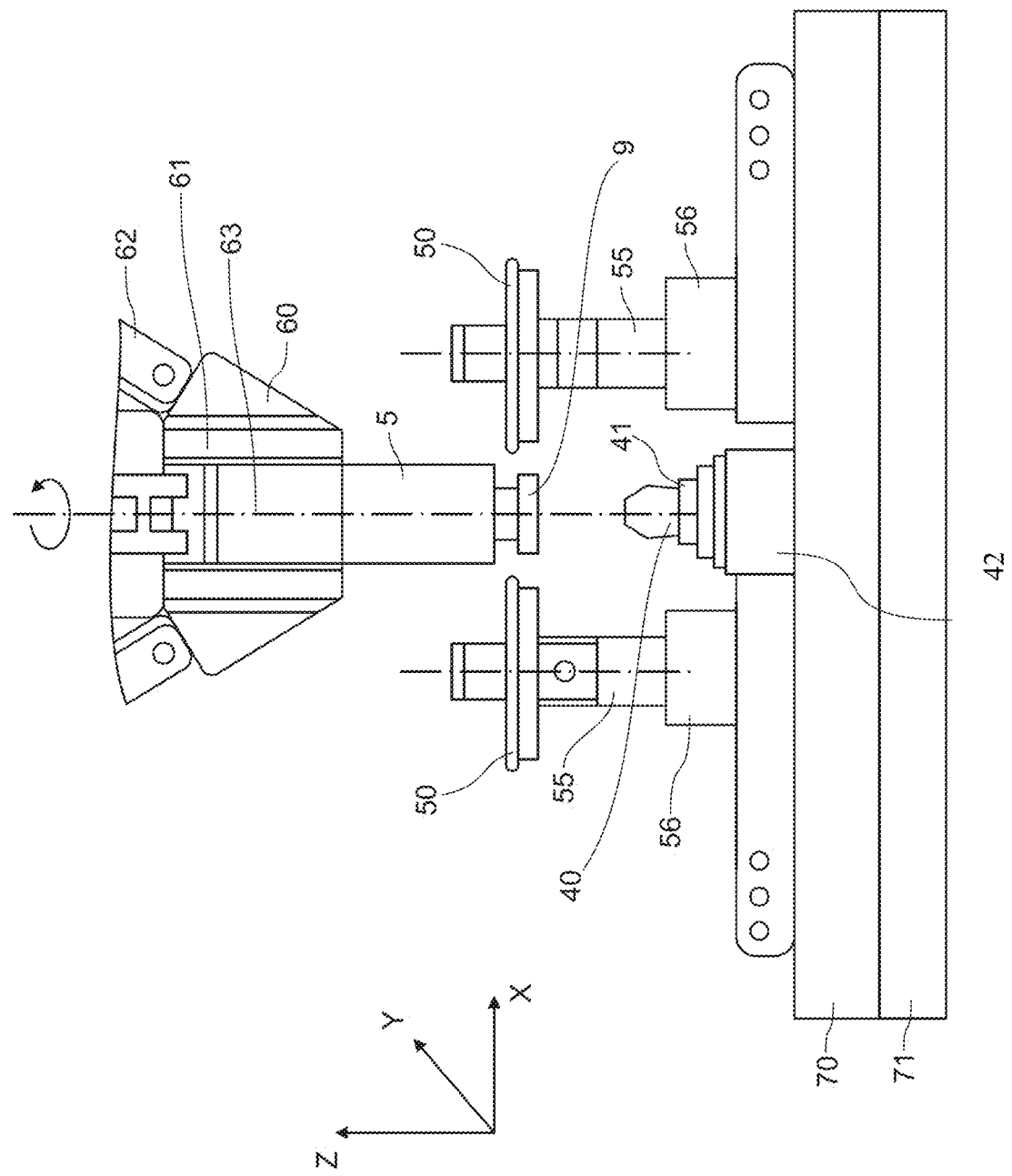
FIG. 5b in a schematic lateral view shows a detail of a hot-shaping device according to the present invention.

FIG. 5b in a schematic lateral view shows a detail of the hot-shaping device according to FIG. 5a in the region of one of the processing stations which serves for molding a neck and for forming the neck opening having a predetermined geometry. The vial 5 is chucked upside down in a rotating holding chuck 60 and is held by clamping jaws 61 of the holding chuck 60, said clamping jaws 61 being able to be opened and radially adjusted by adjusting tensioning levers 62. The holding chuck 60 during hot-forming rotates at a very high rotating speed about the rotation axis 63 which is very precisely vertically aligned. The glass tube to be processed, or after the hot-forming the glass vial 5, is aligned so as to be exactly vertical (exactly parallel to the z-direction) in the holding chuck 60 such that no tumbling movements arise when rotating about the rotation axis 63.

A central shaping mandrel 40 (central opening forming tool) and a plurality of shaping rolls 50 which act as shaping tools for the hot-forming in the region of the later end portion and for hot-forming interact with the shaping mandrel are disposed below the holding chuck 60 on an adjustment unit that is formed by adjustment tables 70, 71. The shaping mandrel 40 is centrically disposed, aligned so as to be exactly vertical, and the center of said shaping mandrel 40 is exactly aligned with the rotation axis 63 of the holding chuck 60 situated thereabove. To this end, the angular orientation of the shaping mandrel 40 and the position of the shaping mandrel in the x-direction and y-direction can be precisely readjusted, to which end a correspondingly conceived adjustment installation 40 on which the shaping mandrel 40 is assembled is provided on the upper adjustment table 70.

A pin, or a thin wire, respectively, can also be used instead of a shaping mandrel as the central opening forming tool in order for the internal diameter of the passage opening in the region of the end portion to be precisely predefined.

The shaping rolls 50 acting as shaping tools are mounted so as to be rotatably movable on columns 55 which are assembled on assigned adjustment installations 56 which are disposed on the upper adjustment table 70. The positions of the columns 55 and of the shaping rolls 50 mounted thereon and the height of the shaping rolls 50 relative to the shaping mandrel 40 can also be precisely readjusted in the x-direction and y-direction in analogous manner by way of the adjustment installations 56, so as to setup the hot-shaping device.

The upper adjustment table 70 is assembled on a lower adjustment table 71 which in the region of one of the processing stations is disposed on a worktop (not shown) of the hot-shaping device.

Below the neck 9, the shaping mandrel 40 is assembled on the detent plate 41. The shaping mandrel 40 is aligned so as to be exactly vertical. For hot-forming, the shaping mandrel 40 is introduced into the neck opening of the vial 5 wherein the shaping rolls 50 act from the outside on the neck opening so as to establish the external contour of the neck opening, and wherein the detent plate 41 acts on the end of the hot-forming so as to precisely establish the shape of the mouth rim. A cavity is configured between the shaping rolls 50, the shaping mandrel 40, and the detent plate 41, the contour of said cavity being established by the external profile of the shaping rolls 50. During the hot-shaping, the external contour and the mouth rim of the glass container 5 adapt exactly to the contour of said cavity. In particular, the shape of the later rolled rim 9 at the upper end of the container to be configured (cf. illustration in FIGS. 11a to 11e) corresponds exactly to the shape of the cavity configured between the shaping rolls 50, the shaping mandrel 40, and the detent plate 41.

The upper adjustment table 71 is configured as a compound slide which can be adjusted in two directions (x, y) perpendicularly to the rotation axis 63 of the holding chuck 60. The lower adjustment table 70 can be precisely adjusted in the z-direction, thus vertically, so as to simultaneously vertically adjust all shaping tools 50 and the shaping mandrel 40 conjointly with the detent plate 41 to a suitable operating height in the hot-forming region.

An actuator for adjusting the shaping mandrel 40 in the z-direction, independently of the assigned shaping rolls 50, for example in order for the shaping mandrel 40 in a later phase of hot-forming be moved further into the opening of a glass container can be provided in the adjustment installations 42. An actuator for precisely adjusting the assigned shaping rolls 50 conjointly with the shaping mandrel 40 having the detent plate 41 in the z-direction in order for variations in the glass volume of the initial glass tube to be compensated for is provided in the z-adjustment installation 71. This actuator can be a piezo-electric drive or a miniature stepper motor for conjointly precisely adjusting the height of the shaping mandrel 40, of the detent plate 41, and of the shaping rolls 50. An adjustment path of up to 0.1 mm or 0.15 mm can be sufficient for the purposes of the present invention in order to ensure constant dimensions in the region of the neck opening, as is discussed hereunder.

Figure 5C:
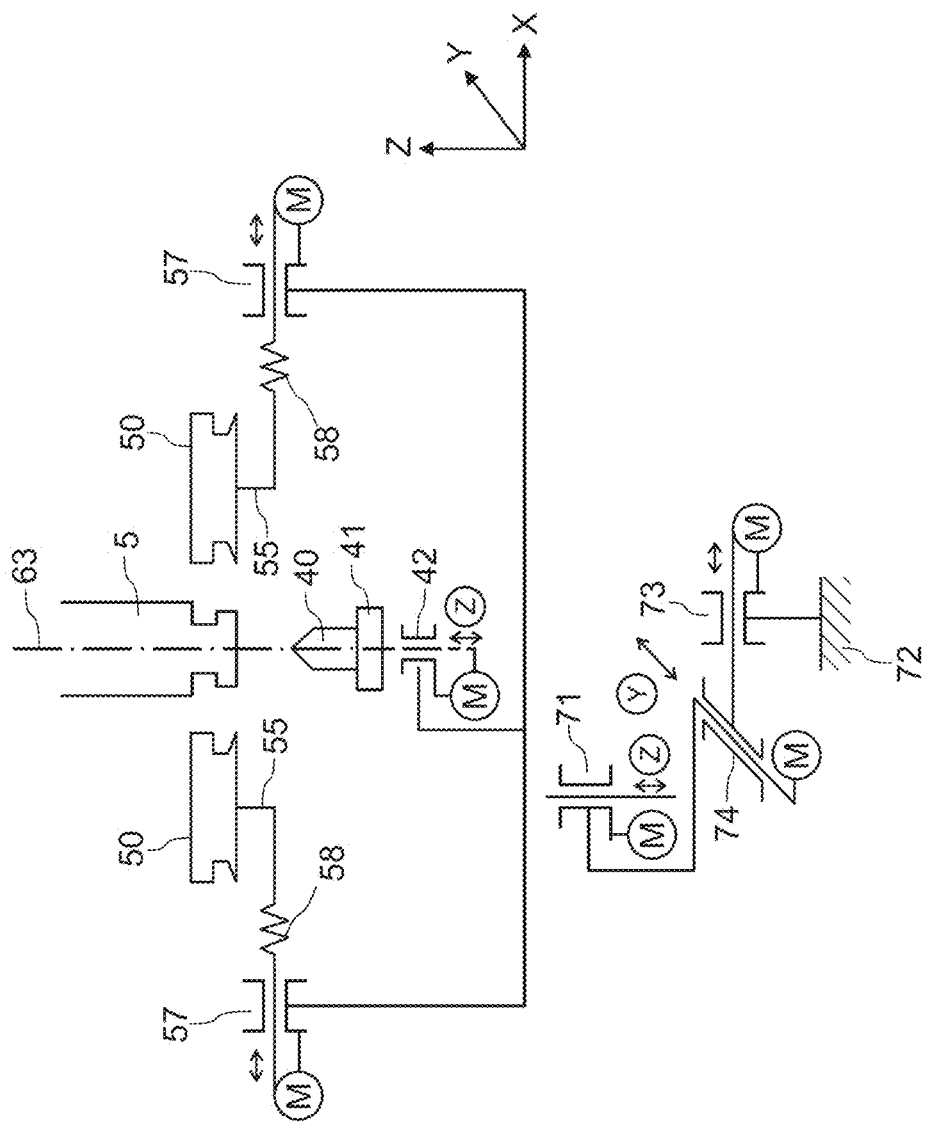
FIG. 5c in a schematic illustration shows a hot-shaping device according to a further embodiment of the present invention.

Further details of the adjustment possibilities are illustrated in the schematic diagram according to FIG. 5c. It can be seen that the shaping mandrel 40, the detent plate 41, and the shaping rolls 50 can be conjointly adjusted by actuating an actuator, for example a stepper motor M, conjointly by means of the z-adjustment installation 71 in the z-direction. The further z-adjustment installation 42 serves for adjusting the shaping mandrel 40 and the detent plate 41 relative to the remaining shaping tools 50 and the worktop 72. The positions of the shaping rolls 50 can be individually adjusted in a direction perpendicular to the z-direction, in particular in the radial direction relative to the shaping mandrel 40, specifically by means of the radial adjustment installation 57 and by actuating the assigned motors M. However, the positions of the shaping rolls 50 are preferably constant during the actual hot-forming. The positions of the shaping rolls 50 can optionally be slightly adjusted in the radial direction by means of springs 58. Further adjustment installations 73, 74 having assigned motors M serve for conjointly adjusting the shaping rolls 50, the shaping mandrel 40, and the detent plate 41.

At the supply position 15 (cf. FIG. 5a) a glass tube or a semi-finished glass intermediate product (hereunder referred to as the workpiece) having a closed base is first chucked in the holding chuck 60. The workpiece is subsequently guided past the burner of flames 18 of a plurality of gas burners 17 by pivoting the rotary table 12 in a step-by-step manner and is suitably heated until the glass in the region of the later neck opening is heat-softened and is thus plastically formable. In the first processing station 20, the shaping mandrel 40 is first introduced into the neck opening of the rotating workpiece, and shaping rolls 50 are guided toward the rotating workpiece at the level of the later shoulder 7 (cf. FIG. 6a), on account of which the shoulder 7 is formed.

Figure 6A:
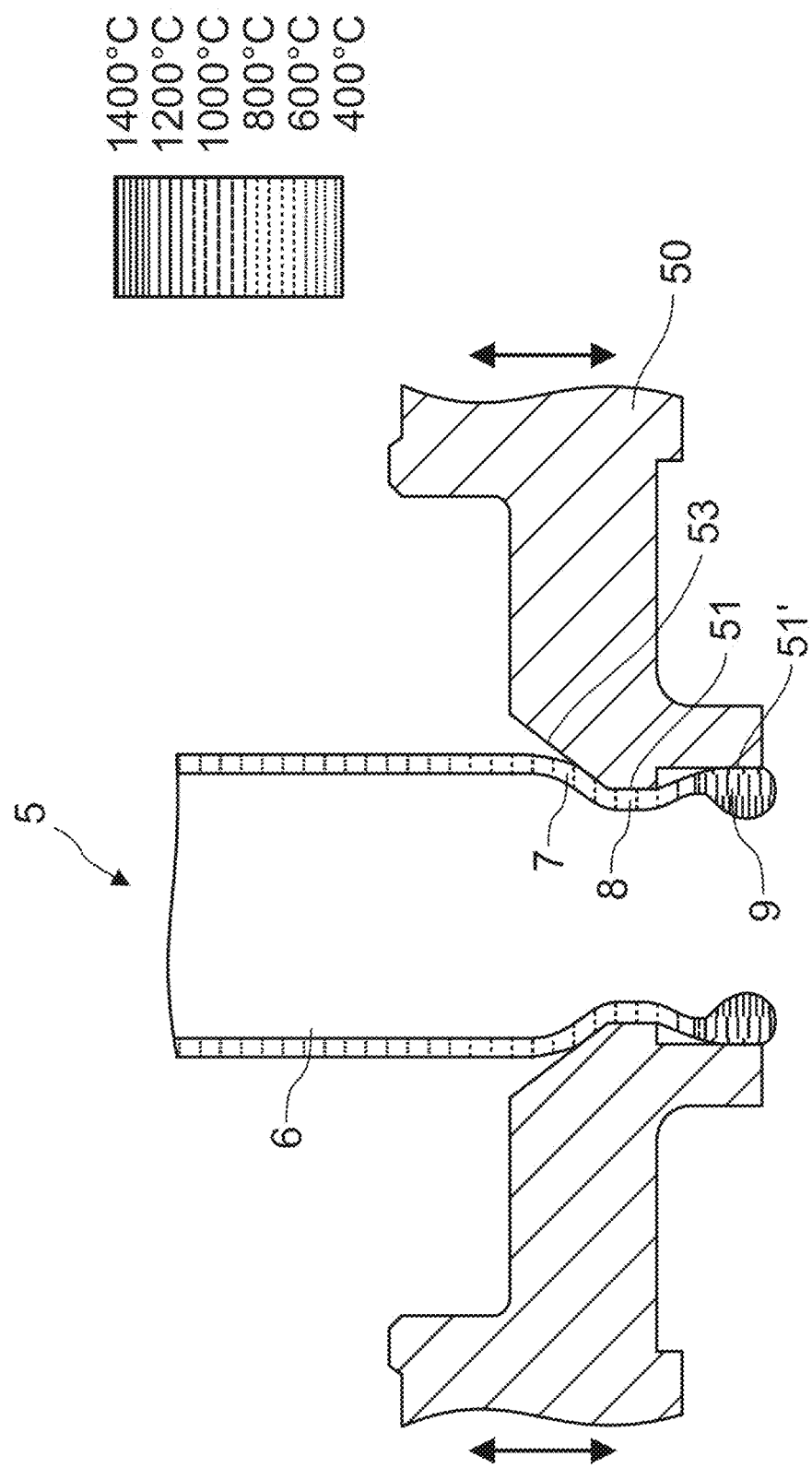
FIG. 6a shows the conditions at the beginning of hot-shaping the heck of a small glass bottle (vial) according to the present invention.
Figure 6B:
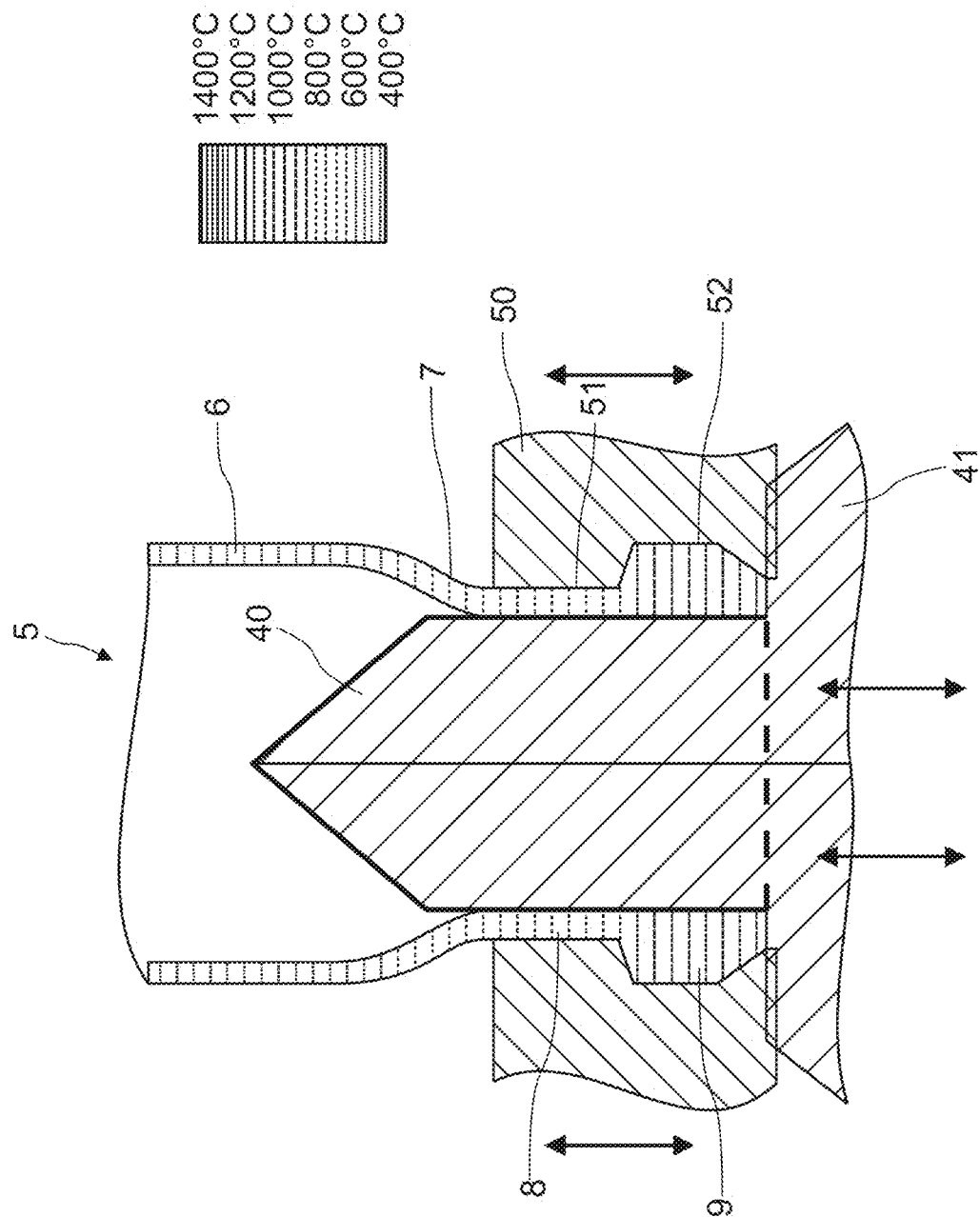
FIG. 6b shows the conditions in a later phase of the hot-shaping of the neck of a small glass bottle (vial) according to the present invention.

The workpiece in the heat-softened state of the glass is subsequently transferred to the processing station 21 in which the neck opening having the mouth region is precisely formed as is shown in FIG. 6b. To this end, shaping rolls 50 having the profile shown in FIG. 6b are used, said profile having a concave forming portion 52 and at the upper and lower end of said profile having vertically extending flat portions 51. The lower end of the shaping rolls 50 is disposed at the height level of the upper side of the detent plate 41, from which the shaping mandrel 40 protrudes perpendicularly. A cavity is configured between the shaping rolls 50, the shaping mandrel 40, and the detent plate 41, the volume of said cavity being defined by the profile and the dimensions of the shaping rolls 50 and the position of the shaping rolls 50 relative to the centrically disposed shaping mandrel 40. More specifically, said volume is externally defined by the imaginary tangents on the shaping rolls 50 which correspond to imaginary circles which are concentric with the shaping mandrel 40.

As is shown in FIG. 6b, the shaping rolls 50 when hot-forming act on the shaping mandrel 40 (the central opening forming tool) in order for the neck 8 located therebetween and the rolled rim 9 of the workpiece 5 to be formed. Furthermore, the detent plate 41 when hot-forming acts on the end of the workpiece 5 in order for the mouth region of the neck opening to be formed. The rapidly rotating workpiece 5 remains in this state for a short temporal period until the glass has cooled to the extent that the formed neck opening is sufficiently dimensionally stable as is shown in FIG. 6b.

As is illustrated by the double arrows in FIGS. 6a and 6b, the shaping rolls 50 and the shaping mandrel 40 for hot-forming by means of an assigned z-adjustment installation can be adjusted exactly vertically (z-direction) to a respective suitable height. In the case of the glass tube to be formed passing a plurality of processing stations having a shaping mandrel and shaping tools, in particular shaping rolls, in succession, it is preferable for the shaping tools, preferably conjointly with the shaping mandrel, to be adjusted by the same distance in the axial direction in all of said plurality of processing stations. This height adjustment in the z-direction can in principle also be performed in a mutually independent manner for the shaping rolls 50 and the shaping mandrel 40. Preferably, all shaping rolls 50 are adjusted in the z-direction conjointly with the shaping mandrel 40, and the latter optionally independently of the detent plate 41.

As opposed to the prior art, the shaping rolls 50 are preferably not elastically pretensioned in a radially inward manner toward the centrically disposed shaping mandrel 40. Rather, the shaping rolls 50 during the hot-forming are disposed at fixed positions which are defined by rotary mountings (columns) 55 (cf. FIG. 5c). In principle, a spring-pretensioned mounting of the shaping rolls 50 can also be provided however.

Figure 8:
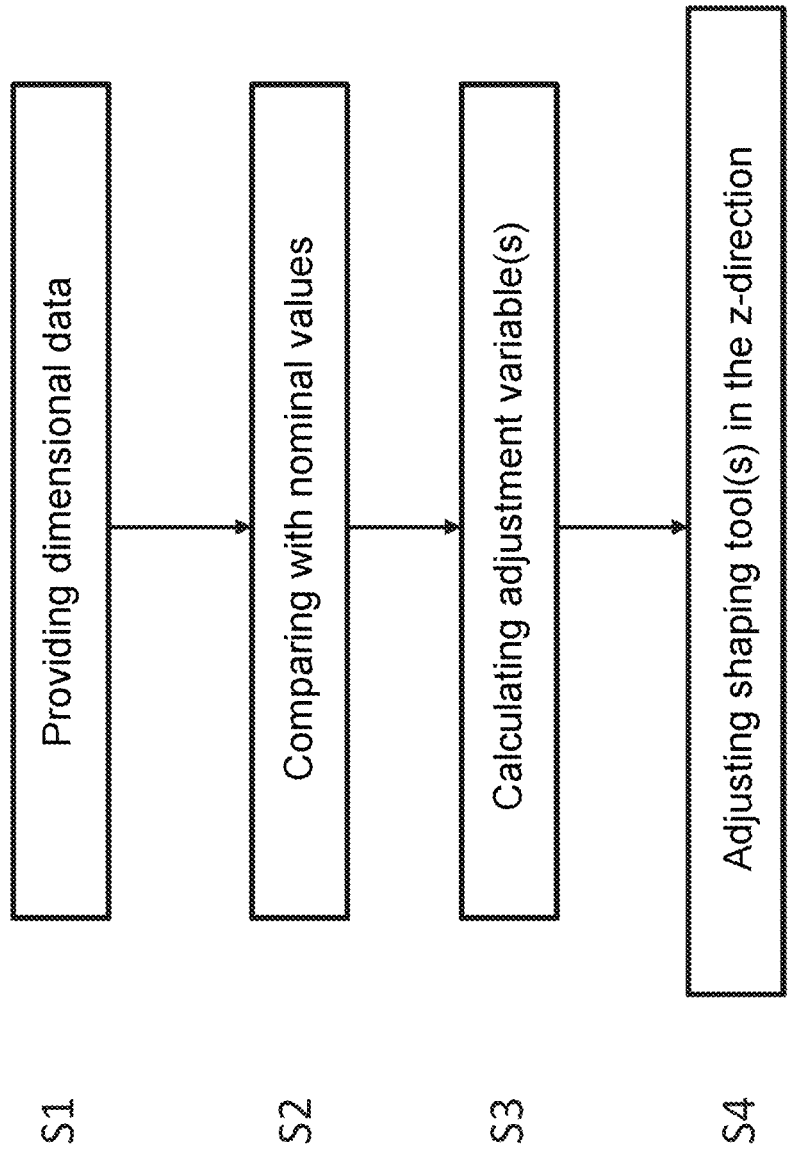
FIG. 8 in a schematic flow diagram shows the most important process steps of a method for hot-shaping according to the present invention.

In order for variations in the dimensions of the workpiece 5 in the forming region, in particular variations in the wall thickness or else the external diameter of the workpiece 5, to be equalized, the procedure according to the invention and according to the flow diagram of FIG. 8 is as follows:

First, in step S1 dimensional data, specifically for the portion of the workpiece to be formed, thus in the region of the neck opening, is provided for the respective workpiece to be formed. To this end, the dimensional data for the respective glass tube to be formed can be ascertained in a non-tactile manner, in particular by means of a video camera having a subsequent image evaluation of the video images in order for the dimensional data to be ascertained such as, for example, the wall thickness and the internal and the external diameter in the region to be formed. Said dimensional data herein is ascertained so as to be resolved in the circumferential direction and in the longitudinal direction of the region to be formed. The actual glass volume of the region to be formed for each glass tube to be formed can be ascertained from said data.

This dimensional data can be ascertained inline for the glass tube to be formed, for example when transferring to the hot-forming device 1 in the region 15. However, this dimensional data for each single glass tube can also be ascertained by a producer in the production of the glass tube and be stored in a database or a data memory or be printed on a data sheet, from where said dimensional data can again be read by the hot-forming device 1 by way of an interface.

Alternatively, the dimensional data for the respective glass tube to be formed is ascertained indirectly, specifically by measuring a glass container which has been produced in a previous hot-forming, said measuring being performed, for example, by means of a video camera having a subsequent image evaluation of the video images in order for the dimensional data to be ascertained. This testing can be performed at the position of the camera 30 directly at or after the hot-forming device 1, for example. Conclusions pertaining to the dimensional data of a workpiece to be formed at a later point in time that is relevant for hot-forming, for example the wall thickness and the internal and the external diameter in the region to be formed of the workpiece to be formed at a later point in time are also possible by evaluating the geometric dimensions in the region of the neck opening on a finished glass container.

The provided dimensional data in step S2 is subsequently further processed by an open-loop or closed-loop control installation. To this end, the ascertained dimensional data can be compared with nominal values, from which deviations of the actual volume of the region to be formed of the workpiece from a nominal volume can be calculated. The nominal values therefor can be stored in a lookup table, for example, which is connected to the open-loop or closed-loop control installation.

Adjustment variables can be calculated from said comparison, knowing the volume of the actual forming region, said volume being defined by the profile and the dimensions of the shaping rolls 50 and the position of the shaping rolls 50 relative to the centrically disposed shaping mandrel 40. Said adjustment variables are issued by the open-loop or closed-loop control installation to actuators which serve for adjusting the shaping mandrel 40 and one or a plurality of the shaping tools 50 in the z-direction, thus to the actuator in the adjustment installation 42 which serves for adjusting the shaping mandrel 40 in the z-direction, and to the actuators in the adjustment installations 56 which serve for adjusting the shaping rolls 50 in the z-direction. Said adjustment of the shaping rolls 50 and of the shaping mandrel 40 in the z-direction can in principle be carried out individually and in a mutually independent manner and in FIGS. 6a and 6b is disposed by the vertical double arrows. However, the shaping rolls 50 and the shaping mandrel 40 are preferably conjointly adjusted in the z-direction, for example by activating the common z-adjustment installation 71 (cf. FIG. 5b).

On account of this adjustment, the volume of the actual forming region is enlarged ("stretched") or decreased ("compressed") in the z-direction such that dimensional variations of the workpiece to be formed can be compensated for in the region of the neck opening, said volume being defined by the profile and the dimensions of the shaping rolls 50 and the position of the shaping rolls 50 relative to the centrically disposed shaping mandrel 40 having the detent plate 41. If the actual glass volume in the region of the neck opening is larger, for example by virtue of a greater wall thickness in this region, the excess material by "stretching" the volume of the actual forming region can flow into the additional volume of the forming region created herein. However, if the actual glass volume in the region of the neck opening is smaller, for example by virtue of a lesser wall thickness in this region, this can be compensated for by "compressing" the volume of the actual forming region such that the heat-softened glass in the entire volume of the forming region bears on the shaping elements and is formed without cavities or the like being created herein which would lead to uncontrolled variations in the geometric dimensions in the neck region of the finished glass container. To this end, the adjustment path of the detent plate 41 can in particular be suitably controlled in the z-direction.

By virtue of the fixed spacing between the shaping rolls 50 and the centrically disposed shaping mandrel 40, important geometric dimensions in the region of the neck opening such as, for example the internal and the external diameter of the rolled rim 9, of the neck 8, and of the shoulder 7 of the finished glass container always remain constant, independently of the actual dimensions of the initial glass tube in the region to be formed. In the case of embodiments in which the hot-forming is performed in a plurality of processing stations but the shaping tools of the processing stations are not all adjusted in same manner in the axial direction, variations in the actual dimensions of the initial glass tube are optionally compensated for by variations in the dimensions of the finished glass container in the z-direction, for example by way of greater tolerances in terms of the position of the rolled rim 9, of the neck 8 and of the shoulder 7 of the finished glass container in the z-direction (longitudinal direction). However, said deviations in the z-direction in most instances in practical applications do not have any influence on important properties of the finished glass container such as, for example, the actual filling volume of a pharmaceutical active ingredient, the retaining force of a closure element for closing the neck opening, or the retaining force of a cap, of a coupling piece or the like, in the region of the neck opening, for example of a flare-fit metal cap or of a coupling piece for coupling a syringe body to the finished glass container. In the case of the hot-forming being performed on a plurality of processing stations and the shaping tools at all processing stations being adjusted in the same manner in the axial direction so as to correspond to the provided dimensional data, said variations in the dimensions of the finished glass container in the z-direction do however not arise in a likewise manner.

The aforementioned adjustment can be understood as open-loop or closed-loop controlling imposed on the provided or ascertained dimensional data of the initial glass tube.

Figure 7:
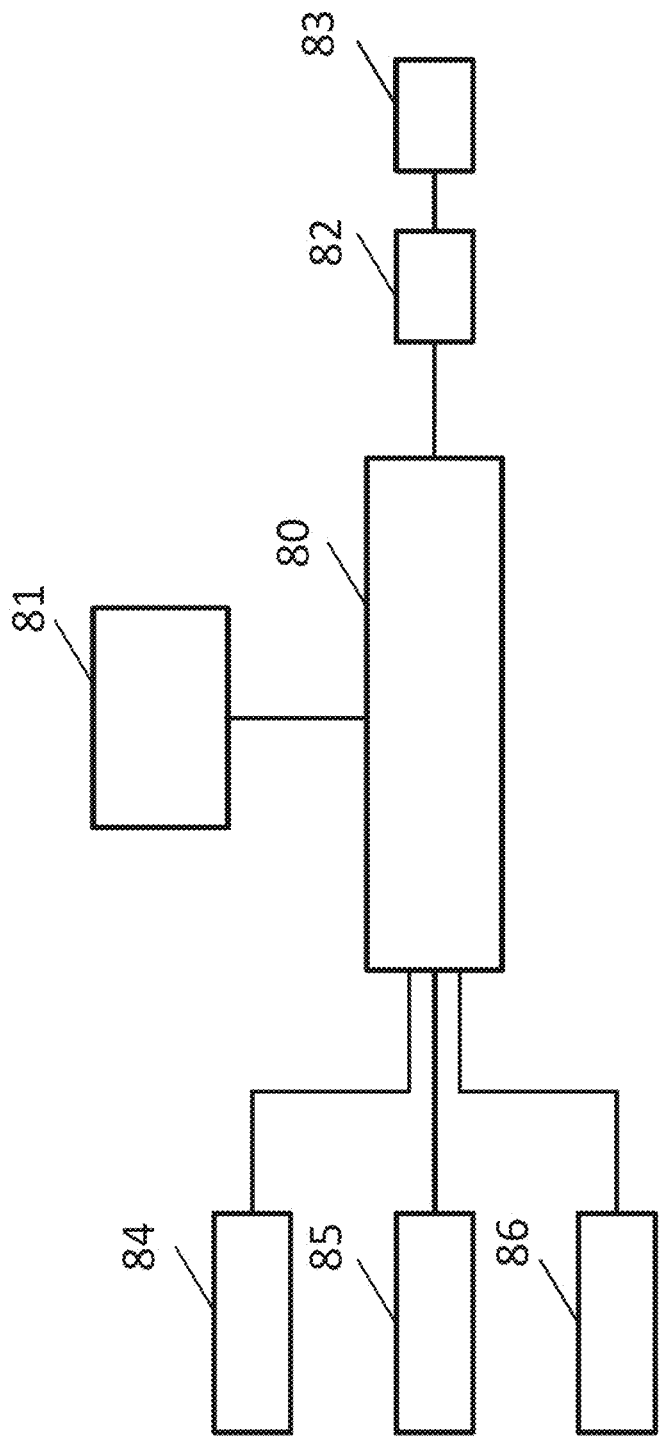
FIG. 7 in a schematic diagram shows the open-loop or closed-loop control installation in a hot-shaping device according to the present invention.

FIG. 7 in a schematic manner summarizes the elements of an open-loop or closed-loop control installation 80 required for carrying out such open-loop closed-loop controlling. The open-loop or closed-loop control installation 80 is assigned a lookup table 81 in which nominal values and reference values are stored. The open-loop or closed-loop control installation 80 is connected to a non-tactile inspection system 84 which operates inline for ascertaining the dimensional data of the initial glass tube and/or to a database or data memory 85, respectively, in which the dimensional data of the initial glass tube are stored, and/or to a downstream non-tactile inspection system 86 for ascertaining the dimensional data in the neck region of a finished glass container after the hot-forming. Upon calculation of the adjustment variables by the open-loop or closed-loop control installation 80, said adjustment variables are issued to a respective actuator 82 which causes an adjustment of the assigned shaping tool 83 in the z-direction so as to correspond to the respective adjustment variable. The respective adjustment of the assigned shaping tool 83 in the z-direction herein is typically at most 0.1 mm or at most 0.15 mm.

In the case of a hot-shaping device which is configured as a carousel machine shown in FIG. 5a, the aforementioned dimensional data is provided or ascertained, respectively, for each initial glass tube held on the rotary table 12, and corresponding adjustment variables for the respective initial glass tube are calculated therefrom. Said adjustment variables are applied to the respective actuators at the respective processing station at a suitable point in time so as to suitably adjust the shaping tools in the z-direction. This means a higher computing complexity for the open-loop or closed-loop control installation.

A temporal period for adjusting the position of the shaping rolls 50 in the axial direction (z) prior to the beginning of the hot-forming of the neck herein is shorter than a temporal period which is required for adjusting the glass tube by rotating movement of the rotary table from a first processing station to the next, second processing station disposed downstream when viewed in the rotating direction.

As will be readily apparent to the person skilled in the art, the aforedescribed adjustment of the shaping tools in the z-direction can be carried out individually in the different phases of molding necks to glass tubes, in particular for forming the shoulder portion (cf. FIG. 6a), for forming the rolled rim (cf. FIG. 6b), and/or for forming the mouth region (cf. FIG. 6b). While it is shown in FIG. 5a that the initial glass tubes are vertically aligned during the hot-forming which in the context of the present invention requires an adjustment of the shaping tools in the z-direction, the. adjustment of the shaping tools can in analogous manner also for hot-shaping device having another alignment of the initial glass tubes during the hot-forming. For example, should the initial glass tubes during the hot-forming be horizontally aligned, the aforedescribed adjustment of the shaping tools for compensating dimensional variations of the initial glass tubes would thus in analogous manner be performed exactly in the horizontal direction, thus exactly parallel to the alignment of the initial glass tubes.

Figure 9:
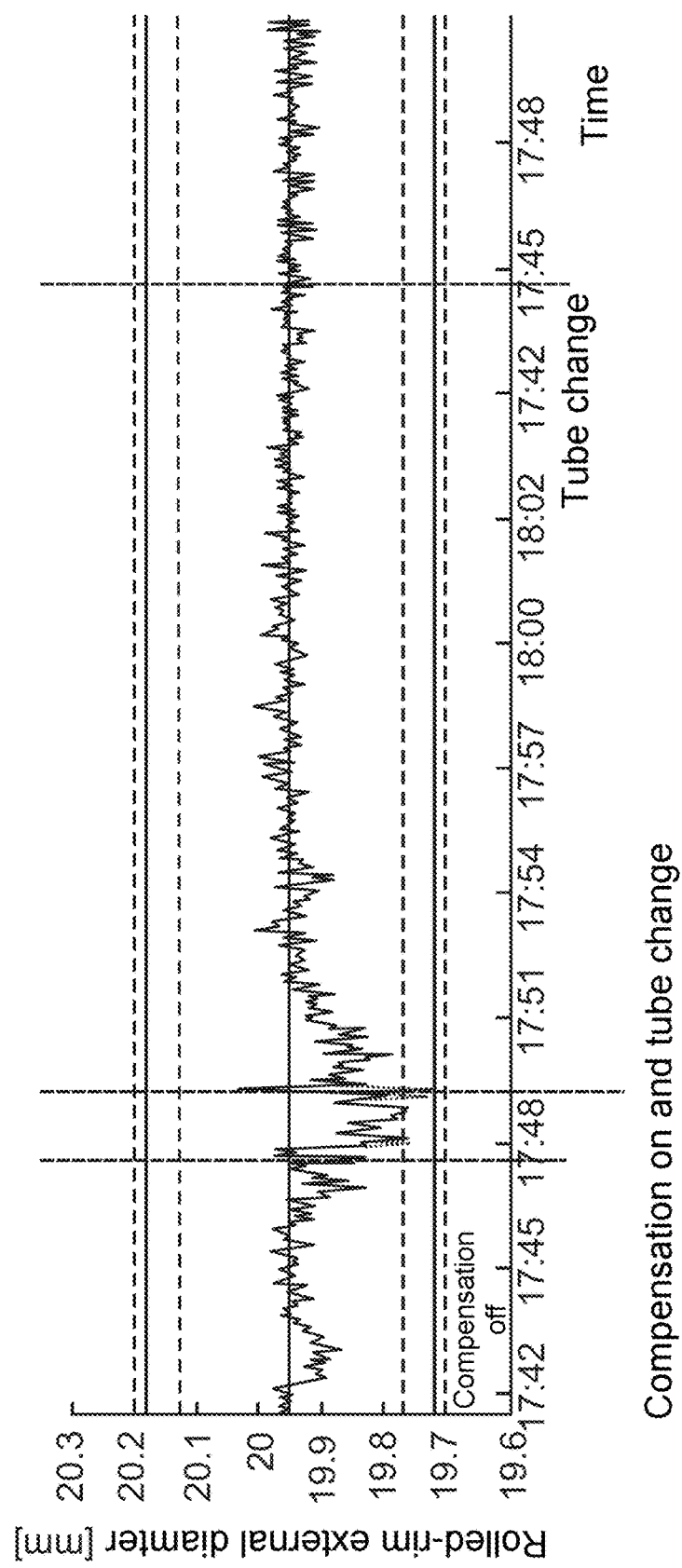
FIG. 9 shows the rolled-rim external diameter of glass vials produced by a method according to the present invention, plotted over the ongoing production time.
Figure 10:
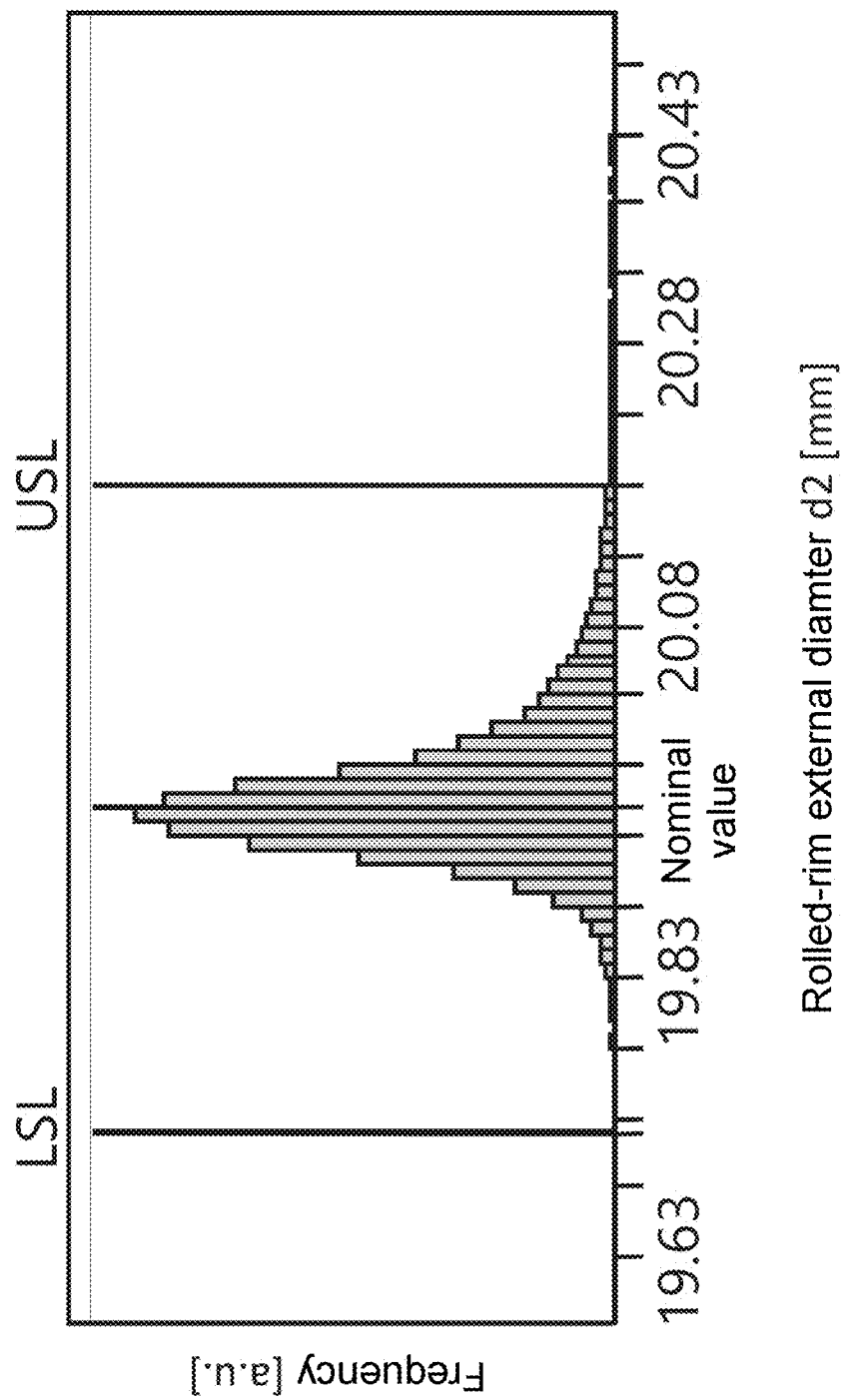
FIG. 10 shows a histogram for the distribution of the dimensional variations in the region of the neck opening of glass vials which have been produced by a method according to the present invention.

Glass containers produced in such a manner can be unequivocally characterized by means of statistical methods and to this extent differ significantly from glass containers produced by conventional shaping methods, as is described hereunder by means of FIGS. 9 and 10.

Figure 1:
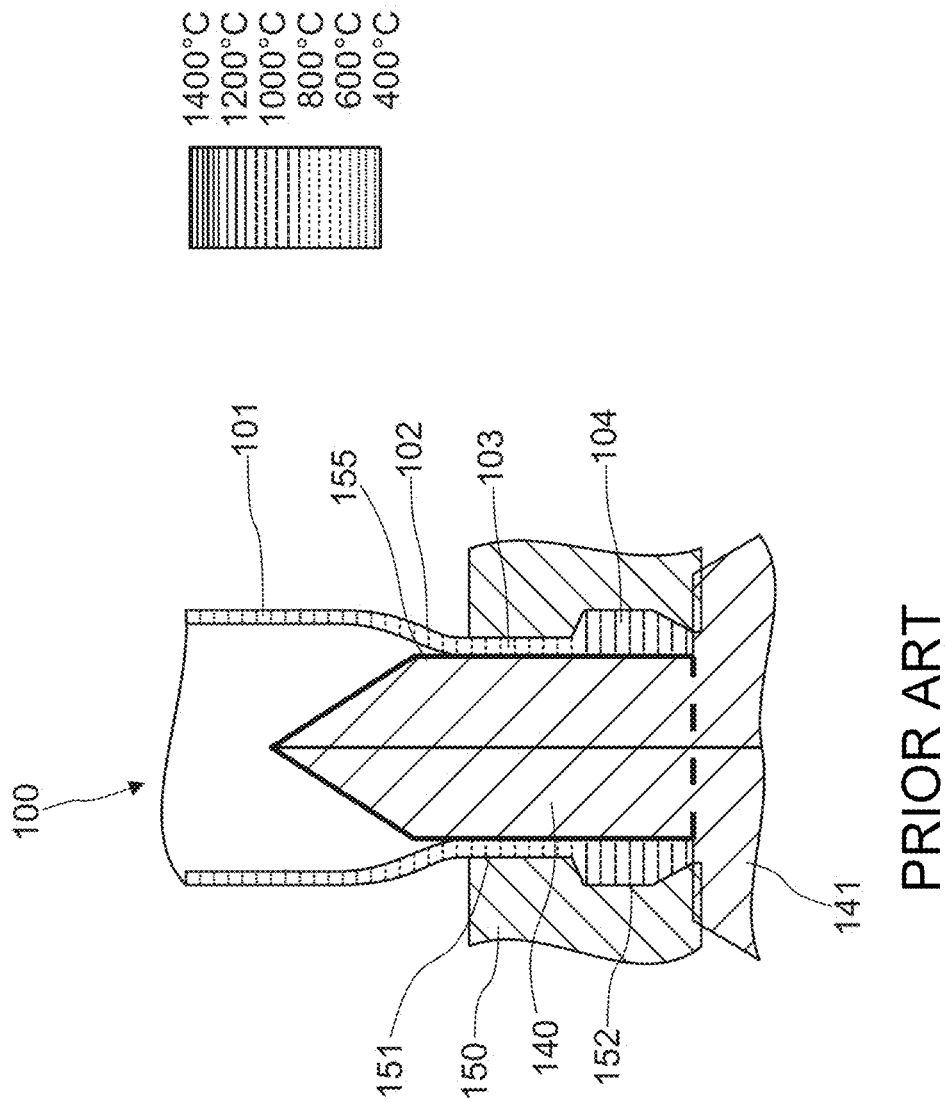
FIG. 1 shows the conditions when hot-shaping the neck of a small glass bottle (vial) according to the prior art.
Figure 2A:
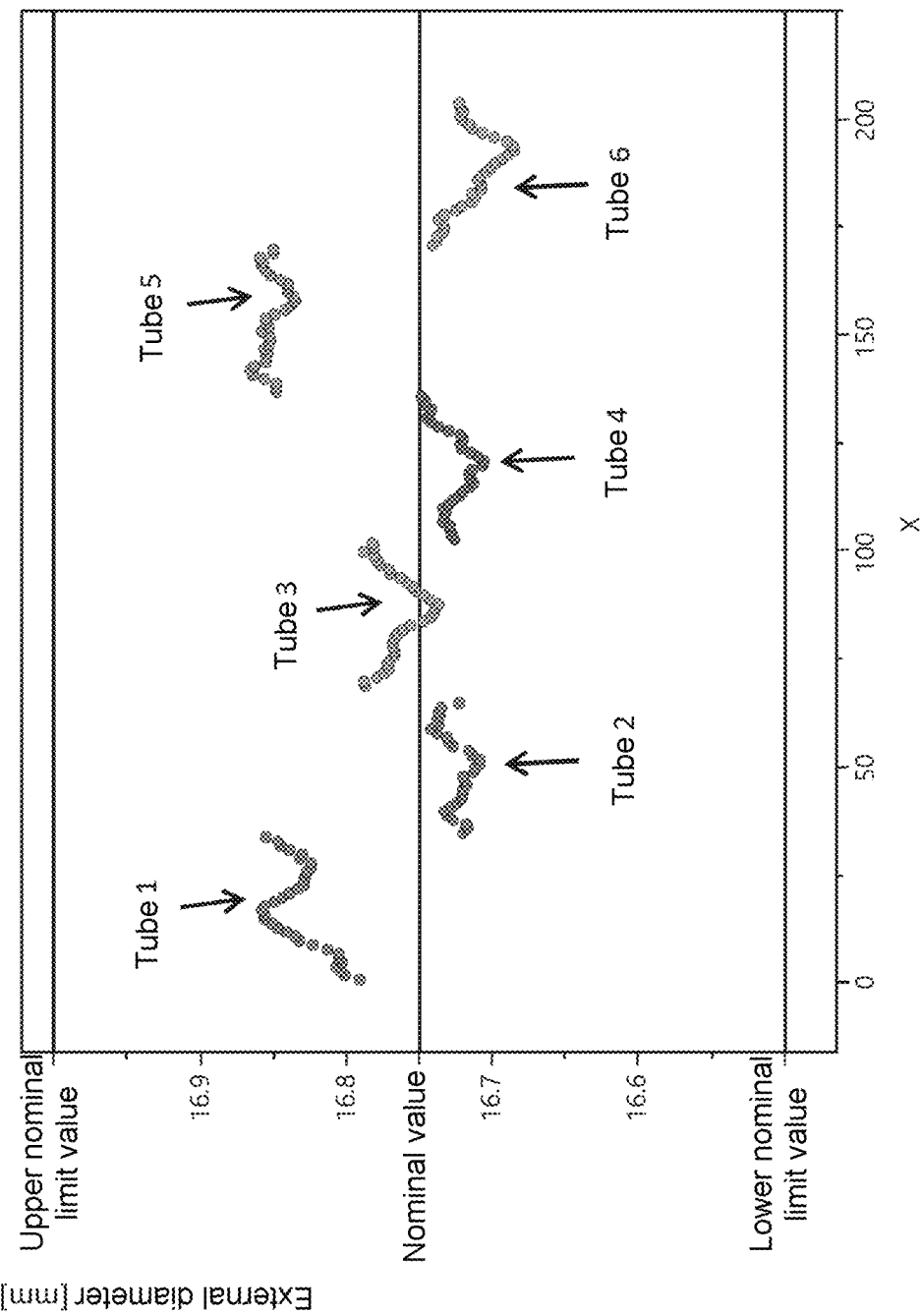
FIG. 2a shows the variation in the external diameter of six glass tubes which are typically used for producing small glass bottles by hot-shaping.
Figure 3:
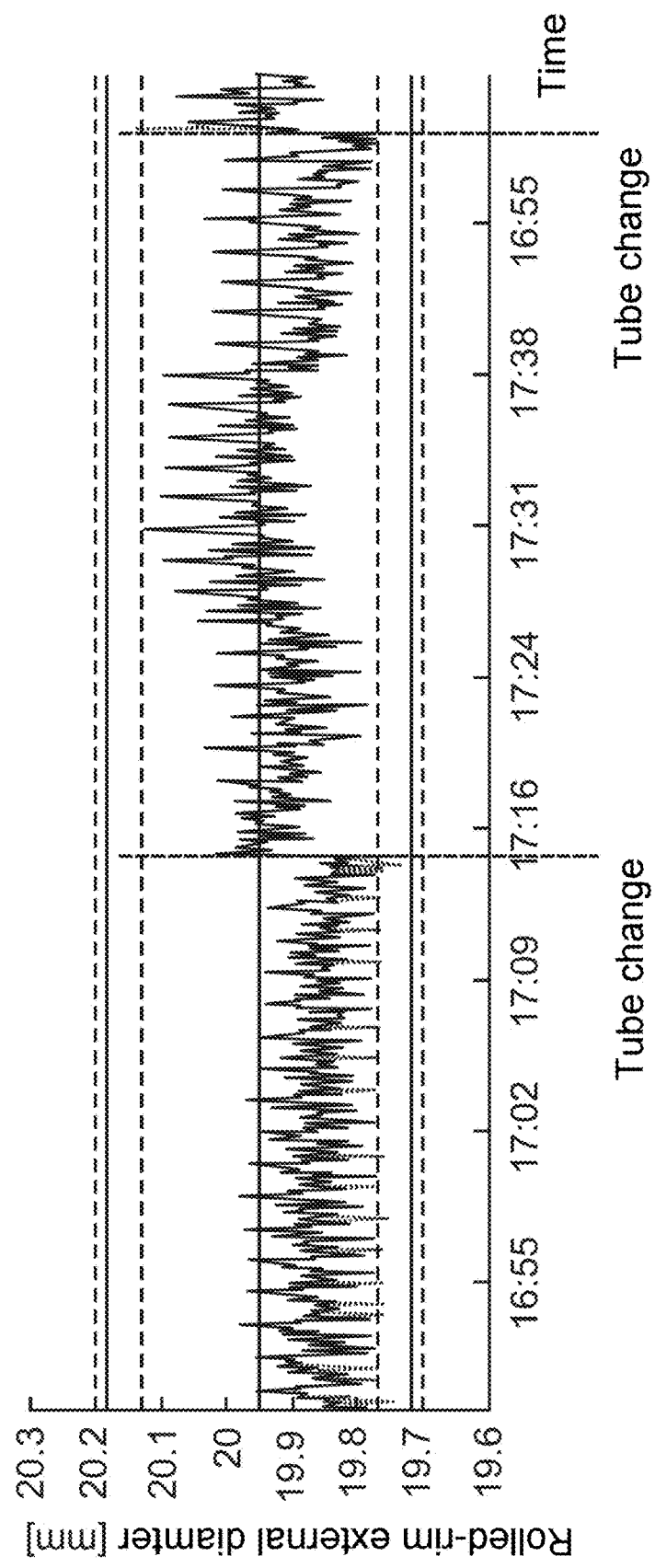
FIG. 3 shows the rolled-rim external diameter of glass vials produced by a method according to the prior art, plotted over the ongoing production time.
Figure 4:
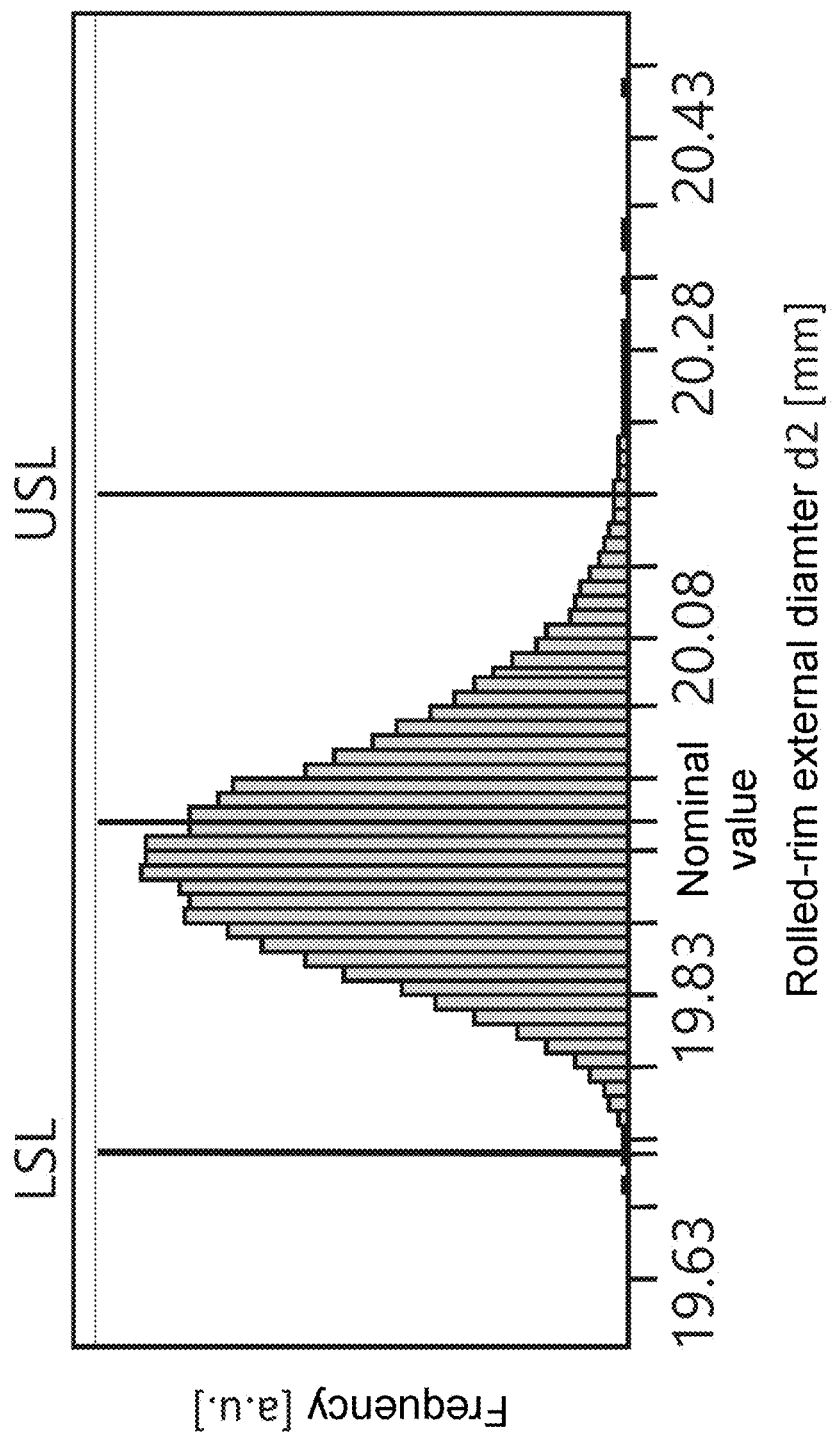
FIG. 4 shows a histogram for the distribution of dimensional variations in the region of the neck opening in glass vials which have been produced by a method according to the prior art.

FIG. 9 shows the rolled-rim external diameter d2 (cf. FIG. 11a) of a glass vial which has been produced by a method according to the present invention having the compensation of dimensional variations of the initial glass tube, wherein the rolled-rim external diameter d2 is plotted over the ongoing production time. It can be clearly seen that the rolled-rim external diameter d2 for practically all glass vials lies in a narrower band than in FIG. 4. Suitable adjustment variables can already be calculated for the first glass vials of the new batch even after a tube change, in particular to glass tubes of a new batch. Glass containers can thus be produced with significantly smaller tolerances.

The higher dimensional accuracy in the radial direction in the case of glass containers which have been produced according to the present invention can also be unequivocally proven using statistical methods. Said glass containers can be unequivocally distinguished from conventionally produced glass containers. FIG. 10 thus shows a histogram for the distribution of the dimensional deviations, specifically of the rolled-rim external diameter, in the region of the neck opening in the case of glass vials which have been produced by a method according to the present invention. The finished glass containers were measured under the same conditions as used for establishing the histogram of FIG. 4. As can be derived from FIG. 10, the variance of the rolled-rim external diameter in the region of the neck opening is significantly smaller and in particular smaller than approximately 0.01% of the rolled-rim external diameter, preferably smaller than approximately 0.0075% of the rolled rim diameter, and more preferably smaller than approximately 0.005% of the rolled-rim external diameter. As can be derived from FIG. 9, a significant improvement in the dimensional accuracy in the direction transverse to the longitudinal direction of the glass containers is already established directly after a change of glass tubes, thus already for the first round of a carousel machine after a change of glass tubes. For example, test series of the inventors pertaining to a long-term operation of a carousel machine resulted in a stable variance of the rolled-rim external diameter of only 0.0045%; the 95% confidence interval for a nominal rolled-rim external diameter of 19.95 mm was approximately only 0.117 mm (in comparison to 0.249 mm for in the case of a conventional carousel machine).

The variance of the rolled-rim external diameter herein serves only as one example for comparable dimensions in the region of the neck opening transverse to the longitudinal direction (z-direction) in the region of the neck opening of glass containers, thus for dimensions in the radial direction, in particular for one or a plurality of the following dimensions in the case of vials or cartridges: glass wall thickness in the region of the shoulder, glass wall thickness in the region of the neck, glass wall thickness in the region of the rolled rim, glass wall thickness in the region of the mouth opening, external diameter in the region of the shoulder, external diameter in the region of the neck, external diameter in the region of the rolled rim, external diameter in the region in the region of the mouth opening, or for one or a plurality of the following dimensions in the case of glass syringes: glass wall thickness in the region of the syringe cone, external diameter in the region of the syringe cone, external diameter of a radial taper in the region of the syringe cone.

Glass containers which are produced according to the present invention are thus characterized by a significantly smaller variance in the geometric dimensions of the glass containers in a direction perpendicular to the longitudinal direction of the glass containers, this being able to be unequivocally proven by measuring a suitably large statistical batch size of glass containers and a statistical evaluation. To this end, a suitable number of glass containers, for example at least 1000 glass containers, are extracted randomly in an arbitrary sequence, thus without any prior measuring, from an ongoing production run after the hot-forming. This batch size should be large enough in order for statistical statements pertaining to the dimensions of the glass containers in the region of the neck opening be able to be made to a sufficient extent. To this end, the batch size should comprise at least 40 glass containers. The dimensional accuracy is in the radial direction in the region of the neck opening is determined for the glass containers thus extracted, and the variances in the respective geometric dimensions are ascertained as listed above.

Conclusions pertaining to open-loop or closed-loop controlling in the z-direction in the context of the present invention can thus already be unequivocally drawn by means of the measured data of the geometric dimensions in the radial direction, the variance thereof being significantly smaller.

Figure 11A:
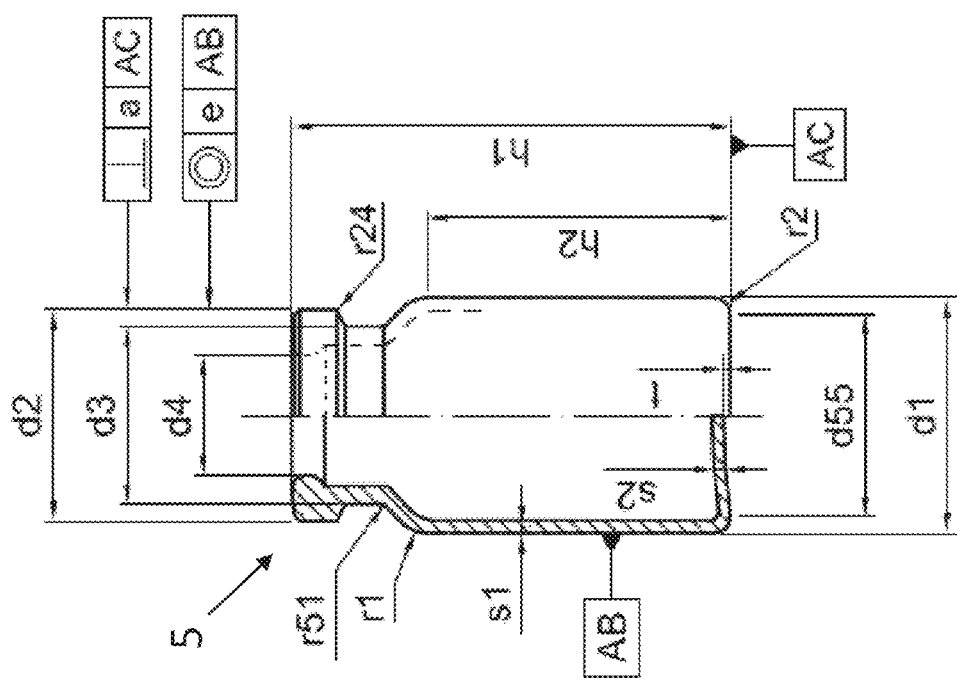
FIG. 11a shows the geometric conditions of a glass vial according to the present invention.
Figure 11B:
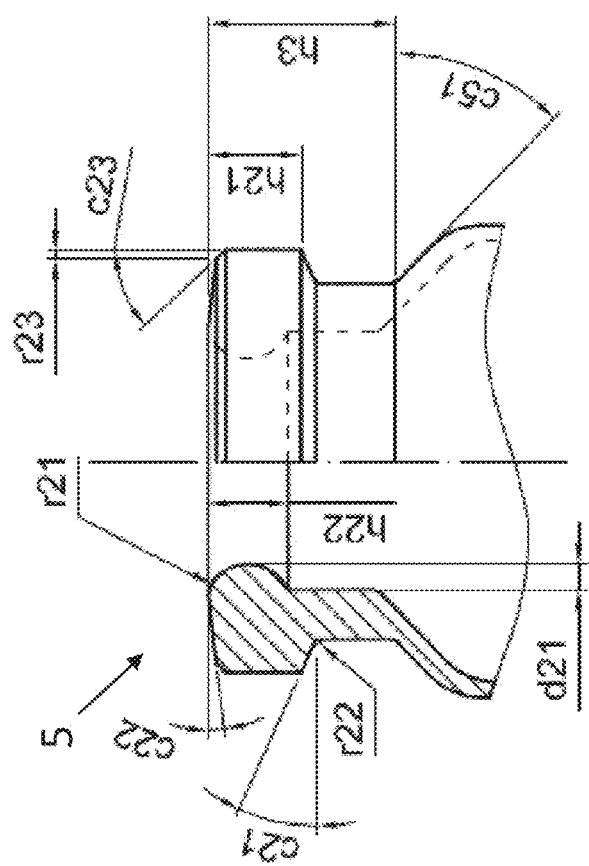
FIG. 11b shows the geometric conditions in the region of the neck opening of a glass vial according to the present invention.
Figure 11C:
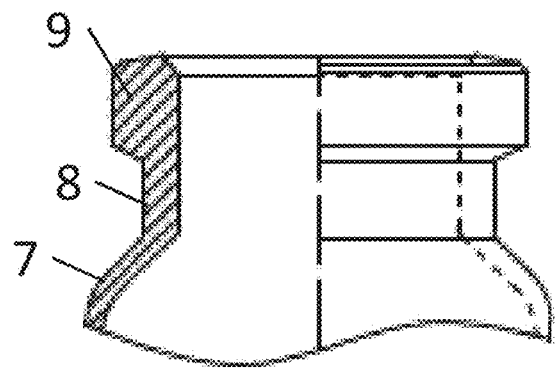
FIGS. 11c to 11e show the geometric conditions in the region of the neck opening of further glass vials according to the present invention.
Figure 11D:
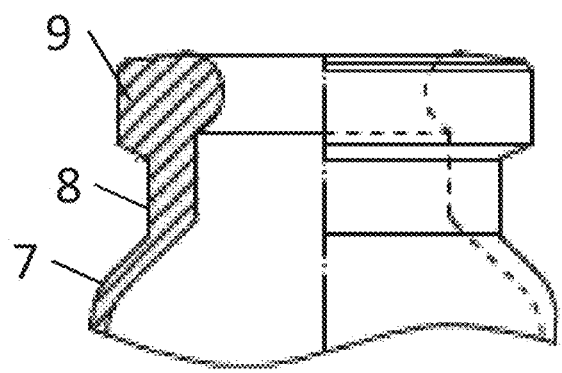
Figure 11E:
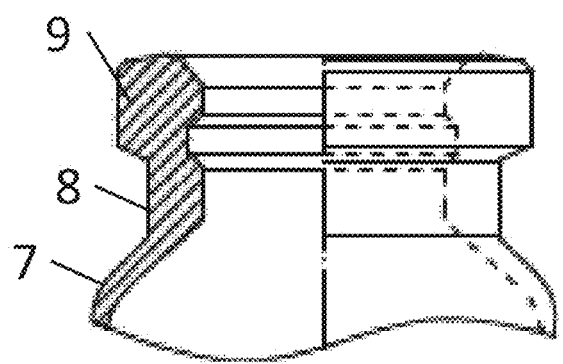

FIGS. 11a and 11b show the aforementioned geometric dimensions in the region of the neck opening of glass vials which according to the invention can be generated in a more precise manner. FIGS. 11c to 11e show the geometric conditions for the neck regions of the three commercially available types of glass vials, specifically of the "no blowback" type (FIG. 11c), of the "European blowback" type (FIG. 11d), and of the "American blowback" type (FIG. 11e).

According to further embodiments of the invention, heating installations, for example the gas burners shown in FIG. 5a, can also be adjusted conjointly with the shaping tools in a motorized manner in the axial direction of the respective glass tube, so as to correspond to the dimensional data for the respective glass tube. To this end, the gas burners can likewise be connected to the z-adjustment installation 71 illustrated in FIG. 5c, for example, or said gas burners can be assigned a dedicated z-adjustment installation which is adjusted in the axial direction of the glass tube in the same manner as has been described above.

While the invention has been described above predominantly by means of the molding of necks to glass bottles or cartridges, the method can be used in the same manner also for forming the syringe cone of a syringe body, thus the in particular conical end portion having an injection opening and a radial taper configured thereon, for example for coupling a Luer lock. In the case of the hot-forming of syringe bodies, the aforementioned shaping mandrel can be configured as a cylindrical post or pin, respectively, for forming the internal contour of the injection opening. As will be readily apparent to the person skilled in the art, the aforementioned method can also be applied in an analogous manner to other types of glass containers which are produced from glass tubes by hot-forming, in particular for the production of glass packaging means in general, also having larger dimensions as are usual for storing pharmaceutical active ingredients.

LIST OF REFERENCE SIGNS

| | |
|---|---|
| 1 | Hot-shaping device |
| 5 | Vial |
| 6 | Cylindrical side wall |
| 7 | Shoulder |
| 8 | Neck |
| 9 | Rolled rim |
| 10 | Host machine |
| 11 | Column with drive |
| 12 | Rotary table |
| 14 | Glass tube/intermediate product |
| 15 | Supply portion |
| 16 | Transfer portion |
| 17 | Gas burner |
| 18 | Burner flame |
| 20 | First hot-forming portion |
| 21 | Second hot-forming portion |
| 22 | Third hot-forming portion |
| 30 | Non-tactile inspection system |
| 40 | Shaping mandrel/forming tool |
| 41 | Base plate |
| 42 | z-adjustment installation |
| 50 | Shaping roll |

| | |
|---|---|
| 51 | Flat portion |
| 51' | Flat portion |
| 52 | Concave portion |
| 53 | Incline |
| 55 | Rotary mount |
| 56 | z-adjustment installation |
| 57 | Radial adjustment |
| 58 | Spring |
| 60 | Holding chuck |
| 61 | Clamping jaws |
| 62 | Tensioning lever |
| 63 | Rotation axis of holding chuck 60 |
| 70 | x/y-adjustment installation |
| 71 | z-adjustment installation |
| 72 | Worktop |
| 73 | x-adjustment installation |
| 74 | y-adjustment installation |
| 80 | Open-loop or closed-loop control |
| 81 | Lookup table |
| 82 | Actuator |
| 83 | shaping tool |
| 84 | inline non-tactile inspection system |
| 85 | Database |
| 86 | offline non-tactile inspection system |
| M | Stepper motor/motor |
| 100 | Vial |
| 101 | Cylindrical side wall |
| 102 | Shoulder |
| 103 | Neck |
| 104 | Rolled rim |
| 110 | Gap |
| 140 | Shaping mandrel |
| 141 | Base plate |
| 150 | Shaping roll |
| 151 | Flat portion of shaping roll 150 |
| 152 | Concave portion of shaping roll 150 |
| 155 | Upper end of bearing region |

What is claimed is:

1. A method for forming glass containers with an opening at an end portion from a glass tube, comprising:
   determining dimensional data of a specific glass tube with a non-tactile inspection system;
   storing the determined dimensional data of the specific glass tube as tube-specific data in a database or a datasheet;
   controlling a position of an exteriorly disposed shaping tool in an axial direction of the glass tube based on an adjustment calculated from the determined dimensional data of the specific glass tube using the tube-specific data read from the database or datasheet; and
   interacting a centrally disposed opening forming tool and the exteriorly disposed shaping tool with an end of the specific glass tube to form the end portion with the opening.

2. The method of claim 1, wherein the step of controlling the position is carried out prior to the step of interacting, and wherein the step of interacting further comprises keeping the position in the axial direction constant during the interacting.

3. The method of claim 1, further comprising controlling a position of the forming tool in the axial direction of the glass tube based on the determined dimensional data and independent of the shaping tool.

4. The method of claim 1, wherein the shaping tool comprises a plurality of shaping tools and wherein the step controlling the position comprises conjointly controlling the position of the plurality of shaping tools.

5. The method of claim 4, further comprising, prior to the step of interacting, controlling a position of the forming tool in the axial direction of the glass tube based on the determined dimensional data.

6. The method of claim 1, further comprising adjusting a position of a heater in the axial direction based on the dimensional data.

7. The method of claim 1, wherein the determined dimensional data is selected from a group consisting of a wall thickness of the end of the glass tube, an external diameter the end of the glass tube, an internal diameter of the end of the glass tube, and any combinations thereof.

8. The method of claim 1, further comprising processing the determined dimensional data by an open-loop or closed-loop control installation to output a control variable, wherein the step of controlling the position comprises inputting the control variable into an actuator that adjusts the position of the shaping tool based on the control variable.

9. The method of claim 8, wherein the step of processing the determined dimensional data comprises comparing the determined dimensional data of the specific glass tube with nominal values for the specific glass tube.

10. The method of claim 1, further comprising holding the shaping tool in a constant plane that is perpendicular to the axial direction.

11. The method of claim 1, wherein the interacting step comprises introducing the forming tool into a neck opening of the end portion in the axial direction.

12. The method of claim 11, wherein the interacting step further comprises moving the shaping tool, in the form of rotatably movable shaping rolls, into contact with an outside of the neck opening.

13. The method of claim 11, wherein the interacting step further comprises contacting a plate of the forming tool with a mouth of the neck opening.

14. The method of claim 1, further comprising:
   holding a plurality of glass tubes in holding chucks that are distributed circumferentially around a rotary table by a portion other than the end portion;
   defining a plurality of processing stations around the rotary table; and
   rotating the rotary table so that the holding chucks present the end portions to a respective one of the plurality of processing stations, wherein the shaping tool is disposed at one of the processing stations,
   wherein the step of controlling the position has a temporal period that is shorter than a temporal period for the step of rotating the rotary table.

15. The method of claim 1, further comprising filling the glass container with a pharmaceutical active ingredient through the opening.

16. The method of claim 1, wherein the controlling of the position of the exteriorly disposed shaping tool in the axial direction of the glass tube is by at most 0.15 mm.

* * * * *